US012634934B2

(12) United States Patent
Dimou et al.

(10) Patent No.: US 12,634,934 B2
(45) Date of Patent: May 19, 2026

(54) UPLINK TRANSMISSIONS IN NEXT AVAILABLE SLOTS

(71) Applicant: QUALCOMM Incorporated, San Diego, CA (US)

(72) Inventors: Konstantinos Dimou, New York, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/547,975

(22) PCT Filed: May 20, 2022

(86) PCT No.: PCT/US2022/072480
§ 371 (c)(1),
(2) Date: Aug. 25, 2023

(87) PCT Pub. No.: WO2022/246472
PCT Pub. Date: Nov. 24, 2022

(65) Prior Publication Data
US 2024/0137933 A1      Apr. 25, 2024
US 2024/0236983 A9      Jul. 11, 2024

(30) Foreign Application Priority Data

May 21, 2021   (GR) .............................. 20210100335

(51) Int. Cl.
*H04W 76/20*          (2018.01)
*H04L 1/1812*         (2023.01)
(Continued)

(52) U.S. Cl.
CPC ....... *H04W 72/1273* (2013.01); *H04L 1/1812* (2013.01); *H04W 72/232* (2023.01); *H04W 72/566* (2023.01); *H04W 76/20* (2018.02)

(58) Field of Classification Search
CPC ... H04L 1/1812; H04L 5/0098; H04L 1/1854; H04L 5/0055; H04L 5/0094; H04L 5/001;
(Continued)

(56) References Cited

U.S. PATENT DOCUMENTS

| | | | |
|---|---|---|---|
| 2021/0219322 A1* | 7/2021 | Chin ...................... | H04W 72/23 |
| 2022/0029753 A1* | 1/2022 | Papasakellariou .... | H04L 1/1861 |
| 2024/0163071 A1* | 5/2024 | Kumagai ................ | H04L 27/26 |

FOREIGN PATENT DOCUMENTS

| | | | |
|---|---|---|---|
| WO | WO-2020146247 A2 | 7/2020 | |
| WO | WO-2021028873 A1 * | 2/2021 | .......... H04W 72/569 |

OTHER PUBLICATIONS

Institute for Information Industry (III): "Enhancement on HARQ-ACK Feedback for URLLC", 3GPP Draft, 3GPP TSG RAN WG1 #96, R1-1902742 Enhancement on HARQ-ACK Feedback for URLLC, 3rd Generation Partnership Project (3GPP), Mobile Competence Centre 650, Route Des Lucioles, F-06921 Sophia-Antipolis Cedex, Fran, vol. RAN WG1, No. Athens, Greece, Feb. 25, 2019-Mar. 1, 2019, Feb. 15, 2019 (Feb. 15, 2019), XP051600437, pp. 1-5, the whole document.

(Continued)

*Primary Examiner* — Lan-Huong Truong
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a network entity, a first downlink transmission associated with a first priority based at least in part on a first downlink grant. The UE may receive, from the network entity, a second downlink transmission associated with a second priority that is higher than the first priority. The UE may drop a first uplink transmission associated with the first downlink transmission based at least in part on the first uplink transmission and a second uplink transmission
(Continued)

400 associated with the second downlink transmission being associated with colliding resources in a slot. The UE may transmit, to the network entity, the first uplink transmission in a next available slot based at least in part on an indication included in the first downlink grant. Numerous other aspects are described.

30 Claims, 10 Drawing Sheets

(51) Int. Cl.
    *H04W 72/1273*     (2023.01)
    *H04W 72/232*     (2023.01)
    *H04W 72/566*     (2023.01)
(58) Field of Classification Search
    CPC . H04W 52/146; H04W 52/54; H04W 52/325;
                                                      H04W 52/48
    See application file for complete search history.

(56)                        References Cited

OTHER PUBLICATIONS

International Search Report and Written Opinion—PCT/US2022/072480—ISA/EPO—Sep. 12, 2022.

* cited by examiner

400

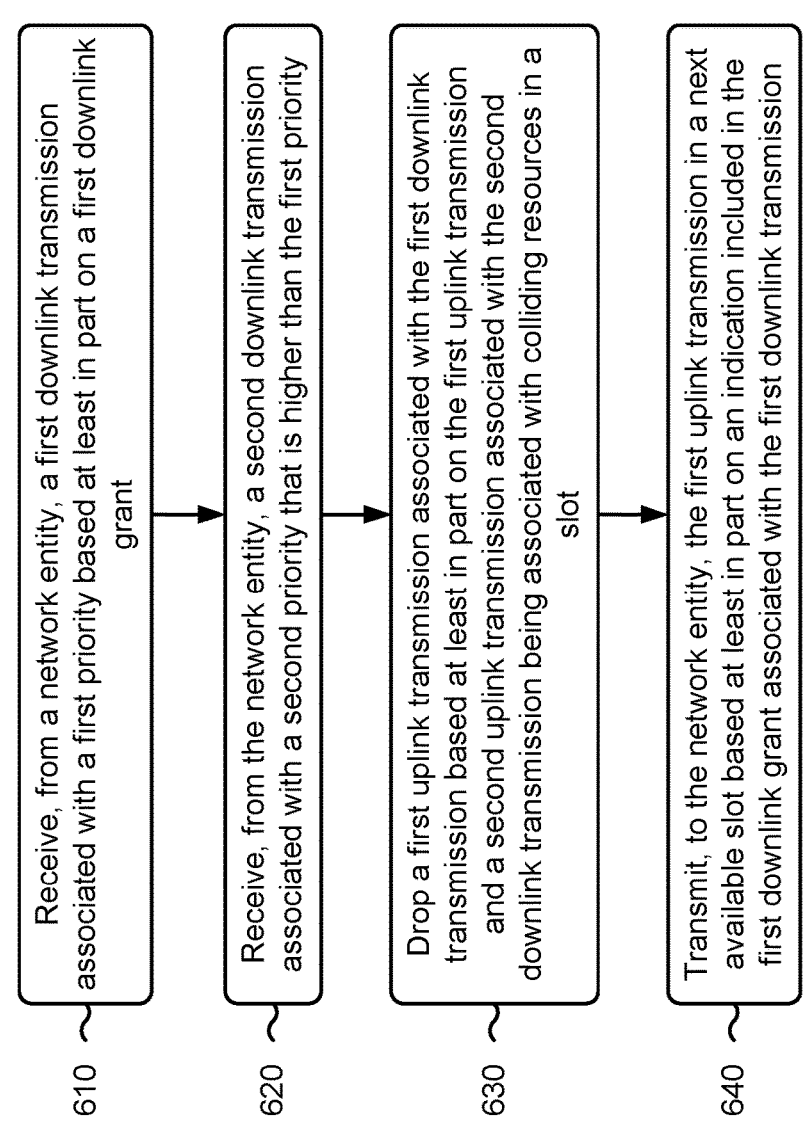

610 Receive, from a network entity, a first downlink transmission associated with a first priority based at least in part on a first downlink grant 620 Receive, from the network entity, a second downlink transmission associated with a second priority that is higher than the first priority 630 Drop a first uplink transmission associated with the first downlink transmission based at least in part on the first uplink transmission and a second uplink transmission associated with the second downlink transmission being associated with colliding resources in a slot 640 Transmit, to the network entity, the first uplink transmission in a next available slot based at least in part on an indication included in the first downlink grant associated with the first downlink transmission

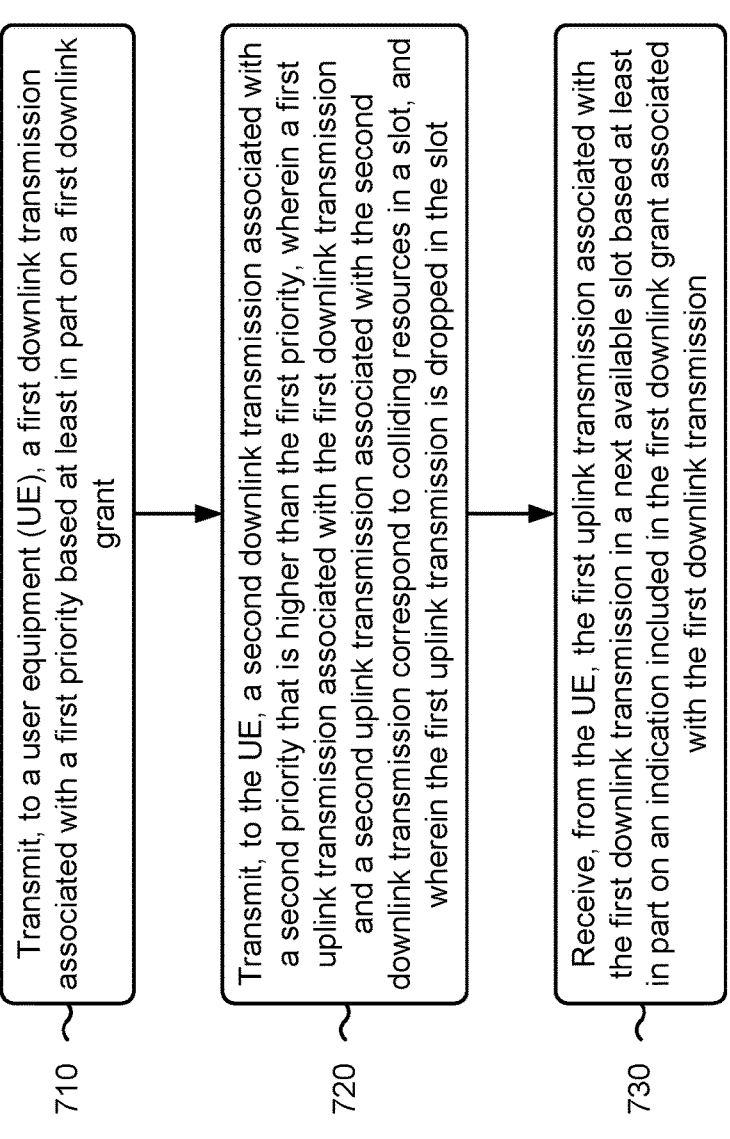

710 — Transmit, to a user equipment (UE), a first downlink transmission associated with a first priority based at least in part on a first downlink grant 720 — Transmit, to the UE, a second downlink transmission associated with a second priority that is higher than the first priority, wherein a first uplink transmission associated with the first downlink transmission and a second uplink transmission associated with the second downlink transmission correspond to colliding resources in a slot, and wherein the first uplink transmission is dropped in the slot 730 — Receive, from the UE, the first uplink transmission associated with the first downlink transmission in a next available slot based at least in part on an indication included in the first downlink grant associated with the first downlink transmission

UPLINK TRANSMISSIONS IN NEXT AVAILABLE SLOTS

CROSS-REFERENCE TO RELATED APPLICATIONS

This Patent Application is a 371 national stage of PCT Application No. PCT/US2022/072480 filed on May 20, 2022, entitled "UPLINK TRANSMISSIONS IN NEXT AVAILABLE SLOTS," which claims priority to Greece Patent Application Serial No. 20210100335, filed on May 21, 2021, entitled "UPLINK TRANSMISSIONS IN NEXT AVAILABLE SLOTS," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for uplink transmissions in next available slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a network entity, a first downlink transmission associated with a first priority based at least in part on a first downlink grant; receive, from the network entity, a second downlink transmission associated with a second priority that is higher than the first priority; drop a first uplink transmission associated with the first downlink transmission based at least in part on the first uplink transmission and a second uplink transmission associated with the second downlink transmission being associated with colliding resources in a slot; and perform, to the network entity, the first uplink transmission in a next available slot based at least in part on an indication included in the first downlink grant associated with the first downlink transmission.

In some aspects, a network entity for wireless communication includes a memory and one or more processors, coupled to the memory, configured to: transmit, to a UE, a first downlink transmission associated with a first priority based at least in part on a first downlink grant; transmit, to the UE, a second downlink transmission associated with a second priority that is higher than the first priority, wherein a first uplink transmission associated with the first downlink transmission and a second uplink transmission associated with the second downlink transmission correspond to colliding resources in a slot, and wherein the first uplink transmission is dropped in the slot; and receive, from the UE, the first uplink transmission associated with the first downlink transmission in a next available slot based at least in part on an indication included in the first downlink grant associated with the first downlink transmission.

In some aspects, a method of wireless communication performed by a UE includes receiving, from a network entity, a first downlink transmission associated with a first priority based at least in part on a first downlink grant; receiving, from the network entity, a second downlink transmission associated with a second priority that is higher than the first priority; dropping a first uplink transmission associated with the first downlink transmission based at least in part on the first uplink transmission and a second uplink transmission associated with the second downlink transmission being associated with colliding resources in a slot; and transmitting, to the network entity, the first uplink transmission in a next available slot based at least in part on an indication included in the first downlink grant associated with the first downlink transmission.

In some aspects, a method of wireless communication performed by a network entity includes transmitting, to a UE, a first downlink transmission associated with a first priority based at least in part on a first downlink grant; transmitting, to the UE, a second downlink transmission associated with a second priority that is higher than the first priority, wherein a first uplink transmission associated with the first downlink transmission and a second uplink transmission associated with the second downlink transmission correspond to colliding resources in a slot, and wherein the first uplink transmission is dropped in the slot; and receiving, from the UE, the first uplink transmission associated with the first downlink transmission in a next available slot based at least in part on an indication included in the first downlink grant associated with the first downlink transmission.

In some aspects, a non-transitory computer-readable medium storing a set of instructions for wireless communication includes one or more instructions that, when executed by one or more processors of a UE, cause the UE to: receive, from a network entity, a first downlink transmission associated with a first priority based at least in part on a first downlink grant; receive, from the network entity, a second downlink transmission associated with a second priority that is higher than the first priority; drop a first uplink transmission associated with the first downlink transmission based at least in part on the first uplink transmission and a second uplink transmission associated with the second downlink transmission being associated with colliding resources in a slot; and transmit, to the network entity, the first uplink transmission in a next available slot based at least in part on an indication included in the first downlink grant associated with the first downlink transmission.

In some aspects, a non-transitory computer-readable medium storing a set of instructions for wireless communication includes one or more instructions that, when executed by one or more processors of a network entity, cause the network entity to: transmit, to a UE, a first downlink transmission associated with a first priority based at least in part on a first downlink grant; transmit, to the UE, a second downlink transmission associated with a second priority that is higher than the first priority, wherein a first uplink transmission associated with the first downlink transmission and a second uplink transmission associated with the second downlink transmission correspond to colliding resources in a slot, and wherein the first uplink transmission is dropped in the slot; and receive, from the UE, the first uplink transmission associated with the first downlink transmission in a next available slot based at least in part on an indication included in the first downlink grant associated with the first downlink transmission.

In some aspects, an apparatus for wireless communication includes means for receiving, from a network entity, a first downlink transmission associated with a first priority based at least in part on a first downlink grant; means for receiving, from the network entity, a second downlink transmission associated with a second priority that is higher than the first priority; means for dropping a first uplink transmission associated with the first downlink transmission based at least in part on the first uplink transmission and a second uplink transmission associated with the second downlink transmission being associated with colliding resources in a slot; and means for transmitting, to the network entity, the first uplink transmission in a next available slot based at least in part on an indication included in the first downlink grant associated with the first downlink transmission.

In some aspects, an apparatus for wireless communication includes means for transmitting, to a UE, a first downlink transmission associated with a first priority based at least in part on a first downlink grant; means for transmitting, to the UE, a second downlink transmission associated with a second priority that is higher than the first priority, wherein a first uplink transmission associated with the first downlink transmission and a second uplink transmission associated with the second downlink transmission correspond to colliding resources in a slot, and wherein the first uplink transmission is dropped in the slot; and means for receiving, from the UE, the first uplink transmission associated with the first downlink transmission in a next available slot based at least in part on an indication included in the first downlink grant associated with the first downlink transmission.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-7 are diagrams illustrating example processes associated with transmitting a low priority physical uplink control channel (PUCCH) transmission, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
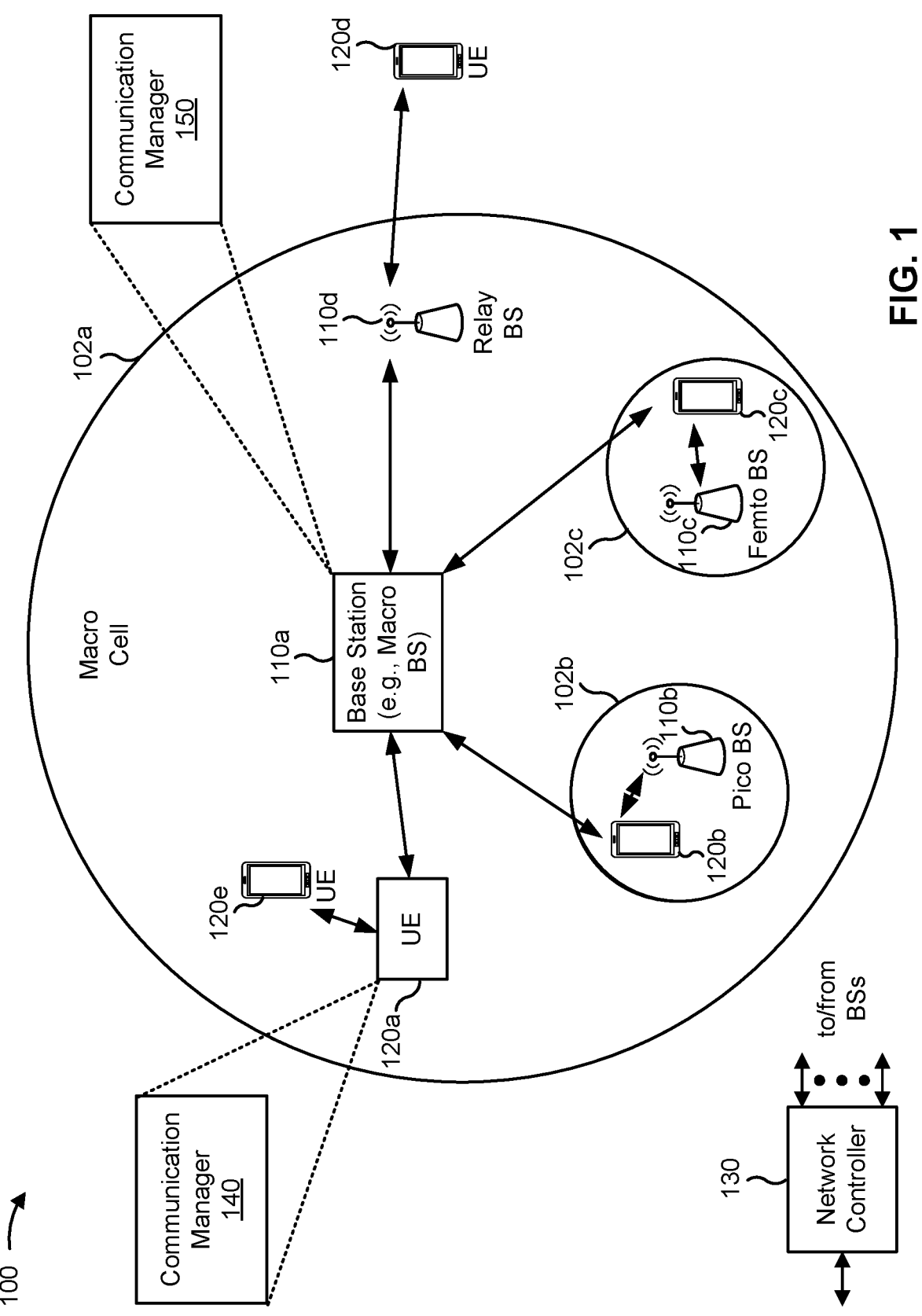
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations

110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network entity, a first downlink transmission associated with a first priority based at least in part on a first downlink grant; receive, from the network entity, a second downlink transmission associated with a second priority that is higher than the first priority; drop a first uplink transmission associated with the first downlink transmission based at least in part on the first uplink transmission and a second uplink transmission associated with the second downlink transmission being associated with colliding resources in a slot; and transmit, to the network entity, the first uplink transmission in a next available slot based at least in part on an indication included in the first downlink grant associated with the first downlink transmission. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit, to a UE, a first downlink transmission associated with a first priority based at least in part on a first downlink grant; transmit, to the UE, a second downlink transmission associated with a second priority that is higher than the first priority, wherein a first uplink transmission associated with the first downlink transmission and a second uplink transmission associated with the second downlink transmission correspond to colliding resources in a slot, and wherein the first uplink transmission is dropped in the slot; and receive, from the UE, the first uplink transmission associated with the first downlink transmission in a next available slot based at least in part on an indication included in the first downlink grant associated with the first downlink transmission. Additionally, or alternatively, the communication manager 150 may perform one or more other operations described herein.

As indicated above, FIG. 1 is provided as an example. Other examples may differ from what is described with regard to FIG. 1.

Figure 2:
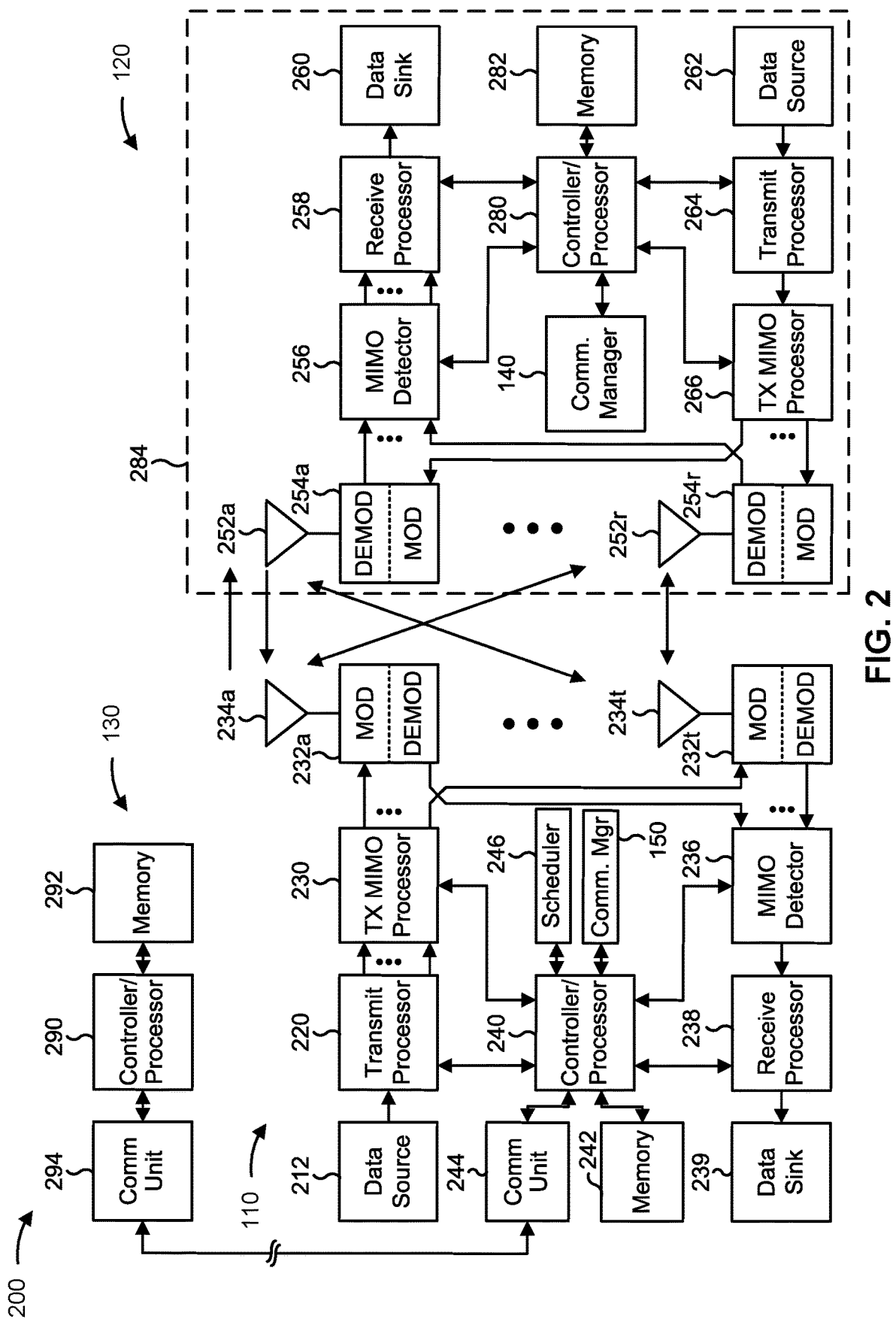
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-5).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-5).

The controller/processor 240 of the base station 110, the controller/processor 280 of the UE 120, and/or any other component(s) of FIG. 2 may perform one or more techniques associated with uplink transmissions in next available slots, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network entity, a first downlink transmission associated with a first priority based at least in part on a first downlink grant (e.g., using antenna 252, DEMOD 254, MIMO detector 256, receive processor 258, controller/processor 280, and/or memory 282); means for receiving, from the network entity, a second downlink transmission associated with a second priority that is higher than the first priority (e.g., using antenna 252, DEMOD 254, MIMO detector 256, receive processor 258, controller/processor 280, and/or memory 282); means for dropping a first uplink transmission associated with the first downlink transmission based at least in part on the first uplink transmission and a second uplink transmission associated with the second downlink transmission being associated with colliding resources in a slot (e.g., using controller/processor 280, and/or memory 282); and/or means for transmitting, to the network entity, the first uplink transmission in a next available slot based at least in part on an indication included in the first downlink grant associated with the first downlink transmission (e.g., using controller/processor 280, transmit processor 264, TX MIMO processor 266, MOD 254, antenna 252, and/or memory 282). The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a network entity (e.g., base station 110) includes means for transmitting, to a UE, a first downlink transmission associated with a first priority based at least in part on a first downlink grant (e.g., using controller/processor 240, transmit processor 220, TX MIMO processor 230, MOD 232, antenna 234, and/or memory 242); means for transmitting, to the UE, a second downlink transmission associated with a second priority that is higher than the first priority (e.g., using controller/processor 240, transmit processor 220, TX MIMO processor 230, MOD 232, antenna 234, and/or memory 242), wherein a first uplink transmission associated with the first downlink transmission and a second uplink transmission associated with the second downlink transmission correspond to colliding resources in a slot, and wherein the first uplink transmission is dropped in the slot; and/or means for receiving, from the UE, the first uplink transmission associated with the first downlink transmission in a next available slot based at least in part on an indication included in the first downlink grant associated with the first downlink transmission (e.g., using antenna 234, DEMOD 232, MIMO detector 236, receive processor 238, controller/processor 240, and/or memory 242). The means for the network entity to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
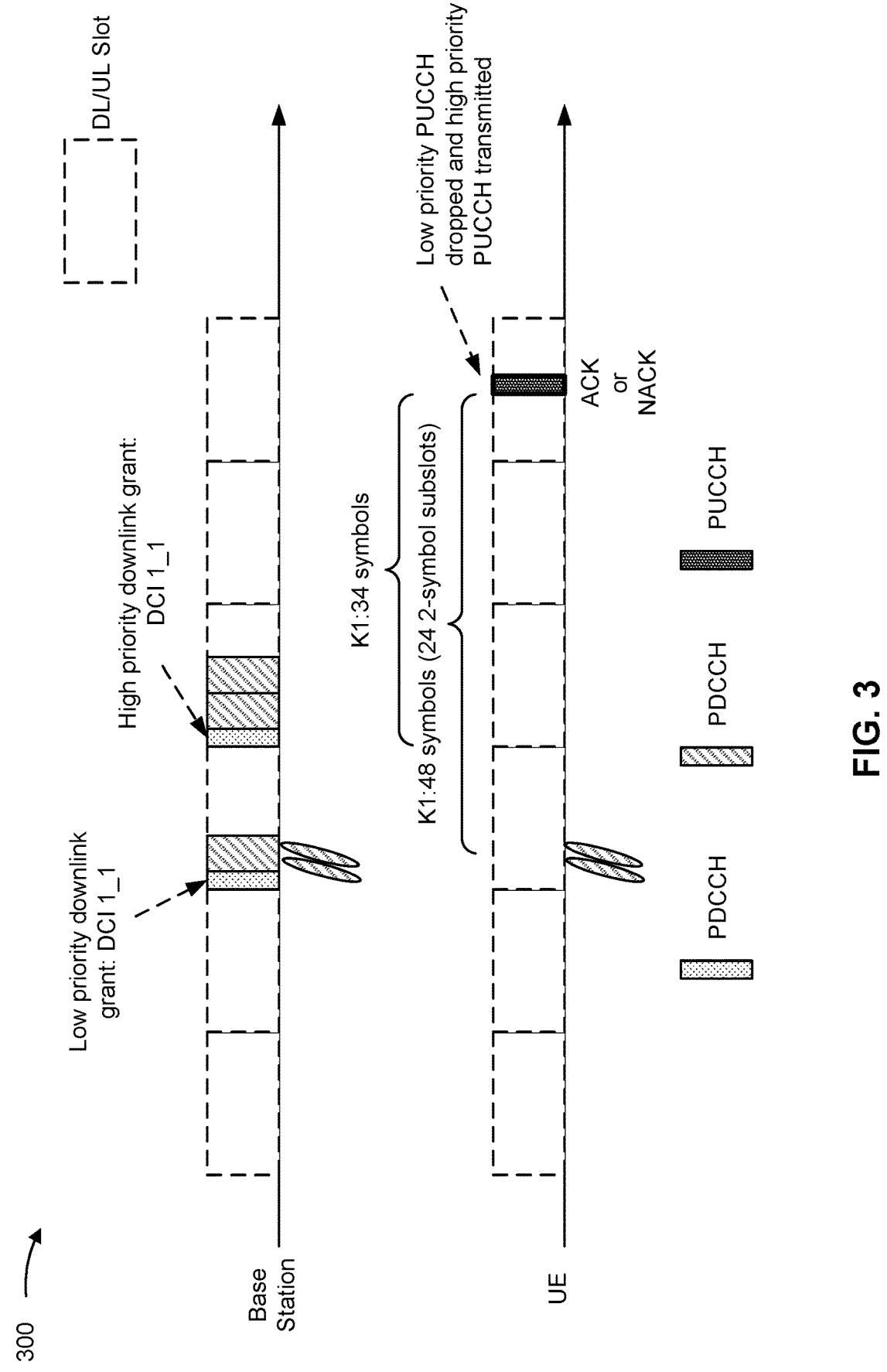
FIG. 3 is a diagram illustrating an example of dropping an uplink transmission associated with a first priority based at least in part on an uplink transmission associated with a second, in accordance with the present disclosure.

FIG. 3 is a diagram illustrating an example 300 of dropping an uplink transmission associated with a first priority based at least in part on an uplink transmission associated with a second priority, in accordance with the present disclosure.

A network entity may transmit, to a UE, a first downlink grant associated with a first priority, such as a low priority. The first downlink grant associated with the first priority may be transmitted in first downlink control information (DCI) (e.g., DCI format 1_1) over a first physical downlink control channel (PDCCH). The first downlink grant associated with the first priority may schedule a first physical downlink shared channel (PDSCH) transmission associated with the first priority. At a later time (e.g., in a next slot), the network entity may transmit, to the UE, a second downlink grant associated with a second priority, such as a high priority. The second priority may be higher than the first priority. The second downlink grant associated with the second priority may be transmitted in second DCI (e.g., DCI format 1_1) over a second PDCCH. The second downlink grant associated with the second priority may schedule a second PDSCH transmission associated with the second priority.

The first downlink grant associated with the first priority may allocate resources for a first physical uplink control channel (PUCCH) transmission associated with the first PDSCH transmission. The first PUCCH transmission may indicate hybrid automatic repeat request (HARQ) feedback, such as an acknowledgement (ACK) or a negative acknowledgement (NACK) based at least in part on the first PDSCH transmission. The first PDSCH transmission and the first PUCCH transmission may be separated by a first quantity of symbols. The first quantity of symbols (e.g., K1 symbols) may be greater than a minimum symbol value plus a one-slot symbol value. Further, the second downlink grant associated with the second priority may allocate resources for a second PUCCH transmission associated with the second PDSCH transmission. The second PUCCH transmission may indicate an ACK or a NACK based at least in part on the second PDSCH transmission. The second PDSCH transmission and the second PUCCH transmission may be separated by a second quantity of symbols. The second quantity of symbols (e.g., K1 symbols) may be greater than a minimum symbol value plus a one-slot symbol value. The first quantity of symbols may be different than the second quantity of symbols.

The resources allocated for the first PUCCH transmission may collide with the resources allocated for the second PUCCH transmission. The resources allocated for the second PUCCH transmission associated with the second priority may overwrite the resources allocated for the first PUCCH transmission associated with the first priority, and the resources allocated for the second PUCCH transmission associated with the second priority may not be sufficient to convey both the first PUCCH transmission and the second PUCCH transmission. A multiplexing of the first PUCCH transmission and the second PUCCH transmission may not be possible using the resources. In this case, the UE may drop the first PUCCH transmission associated with the first priority and the UE may transmit the second PUCCH transmission associated with the second priority using the resources, since the second priority may be higher than the first priority. In other words, the UE may drop the first PUCCH transmission that is a low priority and the UE may transmit the second PUCCH transmission that is a high priority.

As an example, a K1 value associated with the first PDSCH transmission may be 48 symbols. A K1 value associated with the second PDSCH transmission, which may occur one slot after the first PDSCH transmission, may be 34 symbols. As a result, the resources allocated for the first PUCCH transmission may collide with the resources allocated for the second PUCCH transmission. The K1 value associated with the first PDSCH transmission and the first PUCCH transmission may indicate a first PDSCH-to-HARQ-timing, and the K1 value associated with the second PDSCH transmission and the second PUCCH transmission may indicate a second PDSCH-to-HARQ-timing.

As indicated above, FIG. 3 is provided as an example. Other examples may differ from what is described with regard to FIG. 3.

In some cases, a first PUCCH transmission (e.g., indicating an ACK or a NACK) associated with a first priority, such as a low priority, may collide with a second PUCCH transmission associated with a second priority, such as a high priority. The first PUCCH transmission may be in response to a first PDSCH transmission associated with the first priority, and the second PUCCH transmission may be in response to a second PDSCH transmission associated with the second priority. In this case, a UE may drop the first PUCCH transmission and transmit the second PUCCH transmission. When a network entity does not receive the first PUCCH transmission from the UE, the network entity may transmit another DCI that allocates resources for another PDSCH transmission associated with the first priority. In other words, the network entity may retransmit the first PDSCH transmission associated with the first priority. The UE may attempt to transmit another PUCCH transmission in response to the retransmitted first PDSCH transmission associated with the first priority. However, if this other PUCCH transmission again collides with a higher-priority PUCCH transmission, the other PUCCH transmission may again be dropped and this process may be repeated, thereby increasing signaling, increasing resource utilization, and increasing power consumption at the UE.

In various aspects of techniques and apparatuses described herein, a UE may receive, from a network entity, a first PDSCH transmission associated with a first priority based at least in part on a first downlink grant. The UE may receive, from the network entity, a second PDSCH transmission associated with a second priority that is higher than the first priority. For example, the first priority may be a low priority and the second priority may be a high priority. The UE may drop a first PUCCH transmission (e.g., a first PUCCH transmission carrying HARQ feedback) associated with the first PDSCH transmission and the first priority based at least in part on the first PUCCH transmission and a second PUCCH transmission associated with the second PDSCH transmission and the second priority being associated with colliding resources in a slot. In other words, when the first PUCCH transmission associated with the first priority collides with the second PUCCH transmission associated with the second priority, the UE may drop the first PUCCH transmission associated with the first priority. The UE may automatically transmit, to the network entity, the first PUCCH transmission in a next available slot based at least in part on an indication included in the first downlink grant associated with the first PDSCH transmission. The indication may indicate a PUCCH resource indicator (PRI), a symbol timing between the first PDSCH transmission and a transmission of HARQ feedback in the first PUCCH transmission (e.g., a PDSCH-to-HARQ symbol timing), and a validity of the PRI in a quantity of slots when the first PUCCH transmission is dropped based at least in part on the second PUCCH transmission.

In some aspects, the indication may enable the UE to automatically transmit the first PUCCH transmission in the next available slot without receiving a retransmission of the first PDSCH transmission from the network entity, thereby reducing an amount of signaling overhead. The network entity may not need to retransmit the first PDSCH transmission, which may result in the network entity saving energy by not having to schedule and transmit the first PDSCH transmission (e.g., DCI) again to the UE. Further, the UE may save energy by not having to monitor for the first PDSCH transmission again for the same HARQ feedback. Thus, the indication may result in energy efficiency and savings for both the network entity and the UE.

Figure 4:
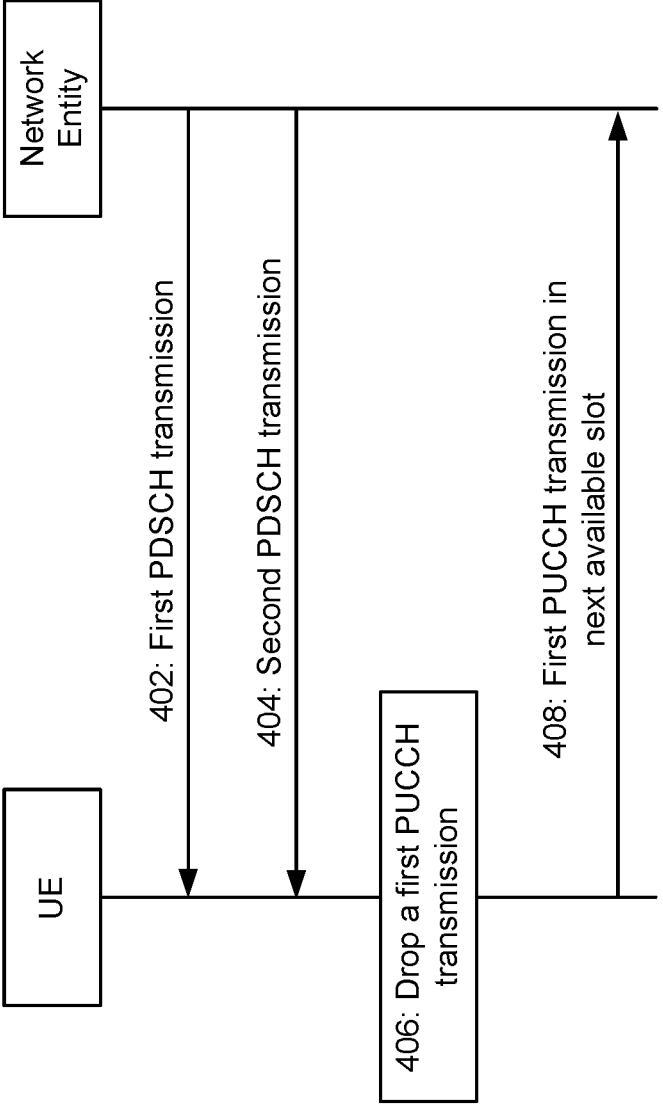
FIGS. 4-5 are diagrams illustrating examples associated with uplink transmissions in next available slots, in accordance with the present disclosure.

FIG. 4 is a diagram illustrating an example 400 associated with uplink transmissions in next available slots, in accordance with the present disclosure. As shown in FIG. 4, example 400 includes communication between a UE (e.g., UE 120) and a network entity (e.g., base station 110). In some aspects, the UE and the network entity may be included in a wireless network, such as wireless network 100.

As shown by reference number 402, the UE may receive, from the network entity, a first PDSCH transmission associated with a first priority based at least in part on a first downlink grant. The first PDSCH transmission associated with the first priority may be a low priority PDSCH transmission. In other words, the first priority may correspond to a low priority. The UE may receive the first downlink grant in a first DCI via a first PDCCH transmission.

In some aspects, the first downlink grant may include an indication. The indication may indicate an uplink channel resource indicator, such as a PRI. The indication may indicate a symbol timing between the first PDSCH transmission and a transmission of HARQ feedback associated with the first PUCCH transmission. In other words, the indication may indicate a PDSCH-to-HARQ symbol timing between the first PDSCH transmission and the first PUCCH transmission that indicates the HARQ feedback. The indication may indicate a validity of the PRI in a quantity of slots (e.g., 8 slots or 8 subslots). In some aspects, the PDSCH-to-HARQ symbol timing may not be equal to a PDSCH processing time.

As shown by reference number 404, the UE may receive, from the network entity, a second PDSCH transmission associated with a second priority based at least in part on a second downlink grant. The second priority may be higher than the first priority. The second PDSCH transmission associated with the second priority may be a high priority PDSCH transmission. In other words, the second priority may correspond to a high priority. The UE may receive the second downlink grant in a second DCI via a second PDCCH transmission.

In some aspects, the UE may receive the second PDSCH transmission from the network entity after receiving the first PDSCH transmission from the network entity. For example, the UE may receive the first PDSCH transmission associated with the first priority in one slot, and the UE may receive the second PDSCH transmission associated with the second priority in a subsequent slot (e.g., in an immediately next slot).

In some aspects, the UE may prepare a first PUCCH transmission based at least in part on the first PDSCH transmission, and the UE may prepare a second PUCCH transmission based at least in part on the second PDSCH transmission. The first PUCCH transmission may be associated with the low priority and the second PUCCH transmission may be associated with the high priority. The first PUCCH transmission may indicate HARQ feedback, such as an ACK or a NACK, for the first PDSCH transmission. The second PUCCH transmission may indicate HARQ feedback, such as an ACK or a NACK, for the second PDSCH transmission. In some cases, the first PUCCH transmission and the second PUCCH transmission may correspond to resources colliding in a time and/or a frequency domain in a slot. Further, the resources may be insufficient to convey both the first PUCCH transmission and the second PUCCH transmission.

As shown by reference number 406, the UE may drop the first PUCCH transmission associated with the first PDSCH transmission and the first priority based at least in part on the first PUCCH transmission and the second PUCCH transmission associated with the second PDSCH transmission and the second priority being associated with the resources that collide in the slot. In other words, the UE may drop the first PUCCH transmission associated with the low priority.

In some aspects, the UE may transmit, to the network entity, the second PUCCH transmission associated with the high priority. The UE may transmit the second PUCCH transmission in the slot instead of the first PUCCH transmission, which may be dropped from being transmitted in the slot. Since the second PUCCH transmission may be associated with the higher priority as compared to the first PUCCH transmission, the UE may drop the first PUCCH transmission in the slot and instead transmit the second PUCCH transmission in the slot. The UE may transmit the second PUCCH transmission prior to transmitting the first PUCCH transmission.

As shown by reference number 408, the UE may transmit, to the network entity, the first PUCCH transmission associated with the first priority in a next available slot based at least in part on the indication included in the first downlink grant associated with the first PDSCH transmission. In other words, the UE may transmit the first PUCCH transmission in the next available slot based at least in part on the PRI, the PDSCH-to-HARQ symbol timing between the first PDSCH transmission and the first PUCCH transmission, and the validity of the PRI in the quantity of slots. The next available slot may be an uplink slot or an uplink/downlink slot, such as a special slot. In some aspects, the UE may transmit the first PUCCH transmission on the PRI in the next available slot, where the PRI in the next available slot may correspond to the PRI indicated in the first downlink grant. In other words, the UE may transmit the first PUCCH transmission in the next available slot on a same PRI as indicated in the first downlink grant. In some aspects, the first PUCCH transmission may be a first PUCCH retransmission.

In some aspects, the UE may automatically transmit the first PUCCH transmission in the next available slot without receiving a retransmission of the first downlink grant and a retransmission of the first PDSCH transmission. In other words, the network entity may not need to retransmit the first downlink grant and/or the first PDSCH, thereby reducing an amount of signaling.

In some aspects, the indication that indicates the PRI, the PDSCH-to-HARQ symbol timing, and the validity of the PRI in the quantity of slots may enable the UE to automatically transmit the first PUCCH transmission in the next available slot without receiving the retransmission of the first PDSCH transmission from the network entity, thereby reducing an amount of signaling overhead. The network entity may not need to retransmit the first PDSCH transmission, which may result in the network entity saving energy by not having to schedule and transmit the first PDSCH transmission (e.g., DCI) again to the UE. Further, the UE may save energy by not having to monitor for the first PDSCH transmission again for the same HARQ feedback. Thus, the indication may result in energy efficiency and savings for both the network entity and the UE.

In some aspects, the UE may attempt to transmit the first PUCCH transmission for up to the quantity of slots associated with the validity of the PRI. For example, when the next available slot is occupied with another uplink transmission, the UE may attempt to transmit the first PUCCH transmission in a subsequent slot. The UE may attempt to transmit the first PUCCH transmission for up to the quantity of slots associated with the validity of the PRI (e.g., 8 slots), as included in the indication received in the first downlink grant. When the quantity of slots has been exhausted, and the UE has still been unable to transmit the first PUCCH transmission, the UE may drop the first PUCCH transmission altogether and no longer attempt to transmit the first PUCCH transmission to the network entity.

In some aspects, the first PUCCH transmission may indicate one or more HARQ bits that satisfy a threshold value (e.g., a quantity of HARQ bits may not exceed the threshold value). The one or more HARQ bits may not be multiplexed with other uplink control information (UCI), such as a channel state information (CSI) report. In some aspects, the UE may transmit the first PUCCH transmission in the next available slot when the PDSCH-to-HARQ symbol timing is not equal to (e.g., greater than or less than) the PDSCH processing time. In some aspects, the UE may transmit the first PUCCH transmission prior to a next semi-persistent scheduled (SPS) PUCCH resource, at which point the first PUCCH transmission may be dropped and the UE may no longer attempt to transmit the first PUCCH transmission.

In some aspects, the UE may receive, from the network entity in the second downlink grant associated with the second PDSCH transmission, a configuration that indicates the validity of the PRI in the quantity of slots. In other words, the UE may receive the configuration indicating the validity of the PRI in the quantity of slots in the second downlink grant, as opposed to the first downlink grant. The UE may transmit the first PUCCH transmission in the next available slot based at least in part on the configuration that indicates the validity of the PRI in the quantity of slots.

In some aspects, the UE may receive, from the network entity, a radio resource control (RRC) configuration that indicates the validity of the PRI in the quantity of slots. In other words, the UE may receive the validity of the PRI in the quantity of slots in the RRC configuration, as opposed to the first downlink grant. The UE may transmit the first PUCCH transmission in the next available slot based at least in part on the RRC configuration that indicates the validity of the PRI in the quantity of slots.

In some aspects, the UE may transmit the first PUCCH transmission in the next available slot based at least in part on the first PUCCH transmission indicating a NACK for the first PDSCH transmission. In other words, when the first PUCCH transmission indicates the NACK, the UE may attempt to transmit the first PUCCH transmission. However, when the first PUCCH transmission is associated with an ACK, the UE may not attempt to transmit the first PUCCH transmission in the next available slot. In this case, the network entity may assume that the first PDSCH transmission was successfully received at the UE because the UE does not transmit the NACK to the network entity.

In some aspects, the first PUCCH transmission may correspond to an SPS PUCCH HARQ, which may collide with downlink symbols as opposed to another PUCCH transmission. In this case, the UE may transmit the first PUCCH transmission in the next available slot based at least in part on the indication included in the first downlink grant.

As indicated above, FIG. 4 is provided as an example. Other examples may differ from what is described with regard to FIG. 4.

Figure 5:
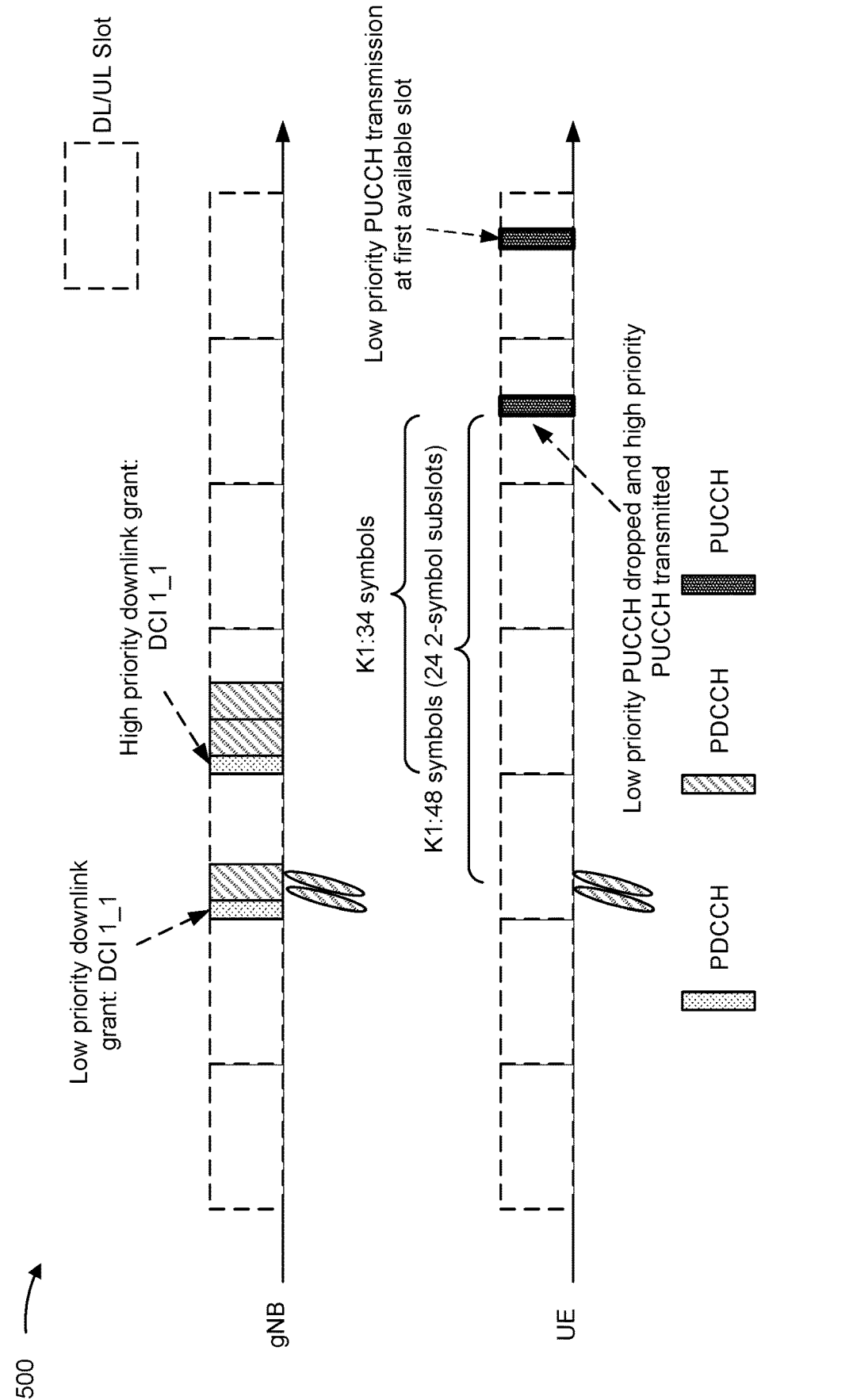

FIG. 5 is a diagram illustrating an example 500 associated with uplink transmissions in next available slots, in accordance with the present disclosure.

In some aspects, a network entity may transmit, to a UE, a first downlink grant associated with a first priority, such as a low priority. The first downlink grant associated with the first priority may be transmitted in first DCI (e.g., DCI format 1_1) over a first PDCCH. The first downlink grant associated with the first priority may schedule a first PDSCH transmission associated with the first priority. The first downlink grant may indicate a PRI, a K1 value, which may correspond to a PDSCH-to-HARQ symbol timing, and a validity of the PRI when a first PUCCH associated with the first PDSCH is canceled or dropped. The validity of the PRI may be in terms of a quantity of slots or subslots (e.g., 8 slots).

In some aspects, at a later time (e.g., in a next slot), the network entity may transmit, to the UE, a second downlink grant associated with a second priority, such as a high priority. The second priority may be higher than the first priority. The second downlink grant associated with the second priority may be transmitted in second DCI (e.g., DCI format 1_1) over a second PDCCH. The second downlink grant associated with the second priority may schedule a second PDSCH transmission associated with the second priority.

In some aspects, the first downlink grant associated with the first priority may allocate resources for a first PUCCH transmission associated with the first PDSCH transmission. The first PUCCH transmission may indicate HARQ feedback, such as an ACK or a NACK based at least in part on the first PDSCH transmission. The second downlink grant associated with the second priority may allocate resources for a second PUCCH transmission associated with the second PDSCH transmission. The second PUCCH transmission may indicate an ACK or a NACK based at least in part on the second PDSCH transmission.

In some aspects, the resources allocated for the first PUCCH transmission may collide with the resources allocated for the second PUCCH transmission. The resources allocated for the second PUCCH transmission associated with the second priority may overwrite the resources allocated for the first PUCCH transmission associated with the first priority, and the resources allocated for the second PUCCH transmission associated with the second priority may not be sufficient to convey both the first PUCCH transmission and the second PUCCH transmission. A multiplexing of the first PUCCH transmission and the second PUCCH transmission may not be possible using the resources. In this case, the UE may drop the first PUCCH transmission associated with the first priority and the UE may transmit the second PUCCH transmission associated with the second priority using the resources, since the second priority may be higher than the first priority. In other words, the UE may drop the first PUCCH transmission that is a low priority and the UE may transmit the second PUCCH transmission that is a high priority.

In some aspects, the UE may transmit the first PUCCH transmission associated with the first priority at a next available slot (e.g., a first available slot) based at least in part on the first downlink grant, which may indicate the PRI, the K1 value corresponding to the PDSCH-to-HARQ symbol timing, and the validity of the PRI (in terms of quantity of slots) when the first PUCCH transmission associated with the first PDSCH transmission is canceled or dropped. The UE may transmit the first PUCCH transmission at a same PRI as indicated in the first downlink grant. In some aspects, when a subsequent slot is occupied, the UE may attempt to transmit the first PUCCH transmission in a later subsequent slot, based at least in part on the quantity of slots associated with the validity of the PRI. For example, when the subsequent slot is occupied, the UE may attempt to transmit the first PUCCH transmission up to an Nth slot (e.g., up to 8 slots) after dropping the first PUCCH transmission. In some aspects, the first PUCCH transmission may be a first PUCCH retransmission (e.g., the UE may retransmit the first PUCCH in a subsequent slot).

As indicated above, FIG. 5 is provided as an example. Other examples may differ from what is described with regard to FIG. 5.

FIG. 6 is a diagram illustrating an example process 600 performed, for example, by a UE, in accordance with the present disclosure. Example process 600 is an example where the UE (e.g., UE 120) performs operations associated with uplink transmissions in next available slots.

As shown in FIG. 6, in some aspects, process 600 may include receiving, from a network entity, a first downlink transmission associated with a first priority based at least in part on a first downlink grant (block 610). For example, the UE (e.g., using communication manager 140 and/or reception component 802, depicted in FIG. 8) may receive, from a network entity, a first downlink transmission associated with a first priority based at least in part on a first downlink grant, as described above.

As further shown in FIG. 6, in some aspects, process 600 may include receiving, from the network entity, a second downlink transmission associated with a second priority that is higher than the first priority (block 620). For example, the UE (e.g., using communication manager 140 and/or reception component 802, depicted in FIG. 8) may receive, from the network entity, a second downlink transmission associated with a second priority that is higher than the first priority, as described above.

As further shown in FIG. 6, in some aspects, process 600 may include dropping a first uplink transmission associated with the first downlink transmission based at least in part on the first uplink transmission and a second uplink transmission associated with the second downlink transmission being associated with colliding resources in a slot (block 630). For example, the UE (e.g., using communication manager 140 and/or dropping component 808, depicted in FIG. 8) may drop a first uplink transmission associated with the first downlink transmission based at least in part on the first uplink transmission and a second uplink transmission associated with the second downlink transmission being associated with colliding resources in a slot, as described above.

As further shown in FIG. 6, in some aspects, process 600 may include transmitting, to the network entity, the first uplink transmission in a next available slot based at least in part on an indication included in the first downlink grant associated with the first downlink transmission (block 640). For example, the UE (e.g., using communication manager 140 and/or transmission component 804, depicted in FIG. 8) may transmit, to the network entity, the first uplink transmission in a next available slot based at least in part on an indication included in the first downlink grant associated with the first downlink transmission, as described above.

Process 600 may include additional aspects, such as any single aspect or any combination of aspects described below and/or in connection with one or more other processes described elsewhere herein.

In a first aspect, the indication included in the first downlink grant associated with the first downlink transmission indicates an uplink channel resource indicator, a symbol timing between the first downlink transmission and a transmission of hybrid automatic repeat request feedback associated with the first uplink transmission, and a validity of the uplink channel resource indicator in a quantity of slots.

In a second aspect, alone or in combination with the first aspect, process 600 includes transmitting the first uplink transmission on the uplink channel resource indicator in the next available slot.

In a third aspect, alone or in combination with one or more of the first and second aspects, process 600 includes attempting to transmit the first uplink transmission for up to the quantity of slots associated with the validity of the uplink channel resource indicator.

In a fourth aspect, alone or in combination with one or more of the first through third aspects, the first downlink transmission is a first PDSCH transmission, the second downlink transmission is a second PDSCH transmission, the first uplink transmission is a first PUCCH transmission, and the second uplink transmission is a second PUCCH transmission.

In a fifth aspect, alone or in combination with one or more of the first through fourth aspects, process 600 includes receiving the first downlink grant in a first DCI via a first PDCCH transmission, and receiving, from the network entity, a second downlink grant in a second DCI via a second PDCCH transmission, wherein the second downlink grant is associated with the second downlink transmission associated with the second priority.

In a sixth aspect, alone or in combination with one or more of the first through fifth aspects, the first downlink transmission associated with the first priority is a low priority downlink transmission, the second downlink transmission associated with the second priority is a high priority downlink transmission, the first uplink transmission associated with the first priority is a low priority uplink transmission, and the second uplink transmission associated with the second priority is a high priority uplink transmission.

In a seventh aspect, alone or in combination with one or more of the first through sixth aspects, process 600 includes transmitting, to the network entity, the second uplink transmission associated with the second priority prior to transmitting the first uplink transmission associated with the first priority.

In an eighth aspect, alone or in combination with one or more of the first through seventh aspects, the first uplink transmission indicates one or more HARQ bits that satisfy a threshold value, and the one or more HARQ bits are not multiplexed with other UCI.

In a ninth aspect, alone or in combination with one or more of the first through eighth aspects, process 600 includes receiving, from the network entity and in a second downlink grant associated with the second downlink transmission, a configuration that indicates a validity of an uplink channel resource indicator in a quantity of slots, wherein the first uplink transmission is transmitted in the next available slot based at least in part on the configuration.

In a tenth aspect, alone or in combination with one or more of the first through ninth aspects, process 600 includes receiving, from the network entity, an RRC configuration that indicates a validity of an uplink channel resource indicator in a quantity of slots, wherein the first uplink transmission is transmitted in the next available slot based at least in part on the RRC configuration.

In an eleventh aspect, alone or in combination with one or more of the first through tenth aspects, process 600 includes transmitting the first uplink transmission based at least in part on a symbol timing between the first downlink transmission and a transmission of HARQ feedback associated with the first uplink transmission not equaling a downlink transmission processing time.

In a twelfth aspect, alone or in combination with one or more of the first through eleventh aspects, process 600 includes transmitting the first uplink transmission prior to a next SPS uplink control channel resource.

In a thirteenth aspect, alone or in combination with one or more of the first through twelfth aspects, process 600 includes transmitting the first uplink transmission without receiving a retransmission of the first downlink grant and a retransmission of the first downlink transmission.

In a fourteenth aspect, alone or in combination with one or more of the first through thirteenth aspects, the first uplink transmission is transmitted in the next available slot based at least in part on the first uplink transmission indicating a NACK for the first downlink transmission.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network entity, in accordance with the present disclosure. Example process 700 is an example where the network entity (e.g., base station 110) performs operations associated with uplink transmissions in next available slots.

As shown in FIG. 7, in some aspects, process 700 may include transmitting, to a UE, a first downlink transmission associated with a first priority based at least in part on a first downlink grant (block 710). For example, the network entity (e.g., using communication manager 150 and/or transmission component 904, depicted in FIG. 9) may transmit, to a UE, a first downlink transmission associated with a first priority based at least in part on a first downlink grant, as described above.

As further shown in FIG. 7, in some aspects, process 700 may include transmitting, to the UE, a second downlink transmission associated with a second priority that is higher than the first priority, wherein a first uplink transmission associated with the first downlink transmission and a second uplink transmission associated with the second downlink transmission correspond to colliding resources in a slot, and wherein the first uplink transmission is dropped in the slot (block 720). For example, the network entity (e.g., using communication manager 150 and/or transmission component 904, depicted in FIG. 9) may transmit, to the UE, a second downlink transmission associated with a second priority that is higher than the first priority, wherein a first uplink transmission associated with the first downlink transmission and a second uplink transmission associated with the second downlink transmission correspond to colliding resources in a slot, and wherein the first uplink transmission is dropped in the slot, as described above.

As further shown in FIG. 7, in some aspects, process 700 may include receiving, from the UE, the first uplink transmission associated with the first downlink transmission in a next available slot based at least in part on an indication included in the first downlink grant associated with the first downlink transmission (block 730). For example, the network entity (e.g., using communication manager 150 and/or reception component 902, depicted in FIG. 9) may receive, from the UE, the first uplink transmission associated with the first downlink transmission in a next available slot based at least in part on an indication included in the first downlink grant associated with the first downlink transmission, as described above.

Process 700 may include additional aspects, such as any single aspect or any combination of aspects described below and/or in connection with one or more other processes described elsewhere herein.

In a first aspect, the indication included in the first downlink grant associated with the first downlink transmission indicates an uplink channel resource indicator, a symbol timing between the first downlink transmission and a transmission of HARQ feedback associated with the first uplink transmission, and a validity of the uplink channel resource indicator in a quantity of slots.

In a second aspect, alone or in combination with the first aspect, process 700 includes receiving the first uplink transmission on the uplink channel resource indicator in the next available slot.

In a third aspect, alone or in combination with one or more of the first and second aspects, the first downlink transmission is a first PDSCH transmission, the second downlink transmission is a second PDSCH transmission, the first uplink transmission is a first PUCCH transmission, and the second uplink transmission is a second PUCCH transmission.

In a fourth aspect, alone or in combination with one or more of the first through third aspects, process 700 includes transmitting the first downlink grant in a first DCI via a first PDCCH transmission, and transmitting, to the UE, a second downlink grant in a second DCI via a second PDCCH transmission, wherein the second downlink grant is associated with the second downlink transmission associated with the second priority.

In a fifth aspect, alone or in combination with one or more of the first through fourth aspects, the first downlink transmission associated with the first priority is a low priority downlink transmission, the second downlink transmission associated with the second priority is a high priority downlink transmission, the first uplink transmission associated with the first priority is a low priority uplink transmission, and the second uplink transmission associated with the second priority is a high priority uplink transmission.

In a sixth aspect, alone or in combination with one or more of the first through fifth aspects, process 700 includes receiving, from the UE, the second uplink transmission associated with the second priority prior to receiving the first uplink transmission associated with the first priority.

In a seventh aspect, alone or in combination with one or more of the first through sixth aspects, the first uplink transmission indicates one or more HARQ bits that satisfy a threshold value, and the one or more HARQ bits are not multiplexed with other UCI.

In an eighth aspect, alone or in combination with one or more of the first through seventh aspects, process 700 includes transmitting, to the UE and in a second downlink grant associated with the second downlink transmission, a configuration that indicates a validity of an uplink channel resource indicator in a quantity of slots, wherein the first uplink transmission is received in the next available slot based at least in part on the configuration.

In a ninth aspect, alone or in combination with one or more of the first through eighth aspects, process 700 includes transmitting, to the UE, an RRC configuration that indicates a validity of an uplink channel resource indicator in a quantity of slots, wherein the first uplink transmission is received in the next available slot based at least in part on the RRC configuration.

In a tenth aspect, alone or in combination with one or more of the first through ninth aspects, process 700 includes receiving the first uplink transmission based at least in part on a symbol timing between the first downlink transmission and a transmission of HARQ feedback associated with the first uplink transmission not equaling a downlink transmission processing time.

In an eleventh aspect, alone or in combination with one or more of the first through tenth aspects, process 700 includes receiving the first uplink transmission prior to a next SPS uplink control channel resource.

In a twelfth aspect, alone or in combination with one or more of the first through eleventh aspects, process 700 includes receiving the first uplink transmission without transmitting a retransmission of the first downlink grant and a retransmission of the first downlink transmission.

In a thirteenth aspect, alone or in combination with one or more of the first through twelfth aspects, the first uplink transmission is received in the next available slot based at least in part on the first uplink transmission indicating a NACK for the first downlink transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
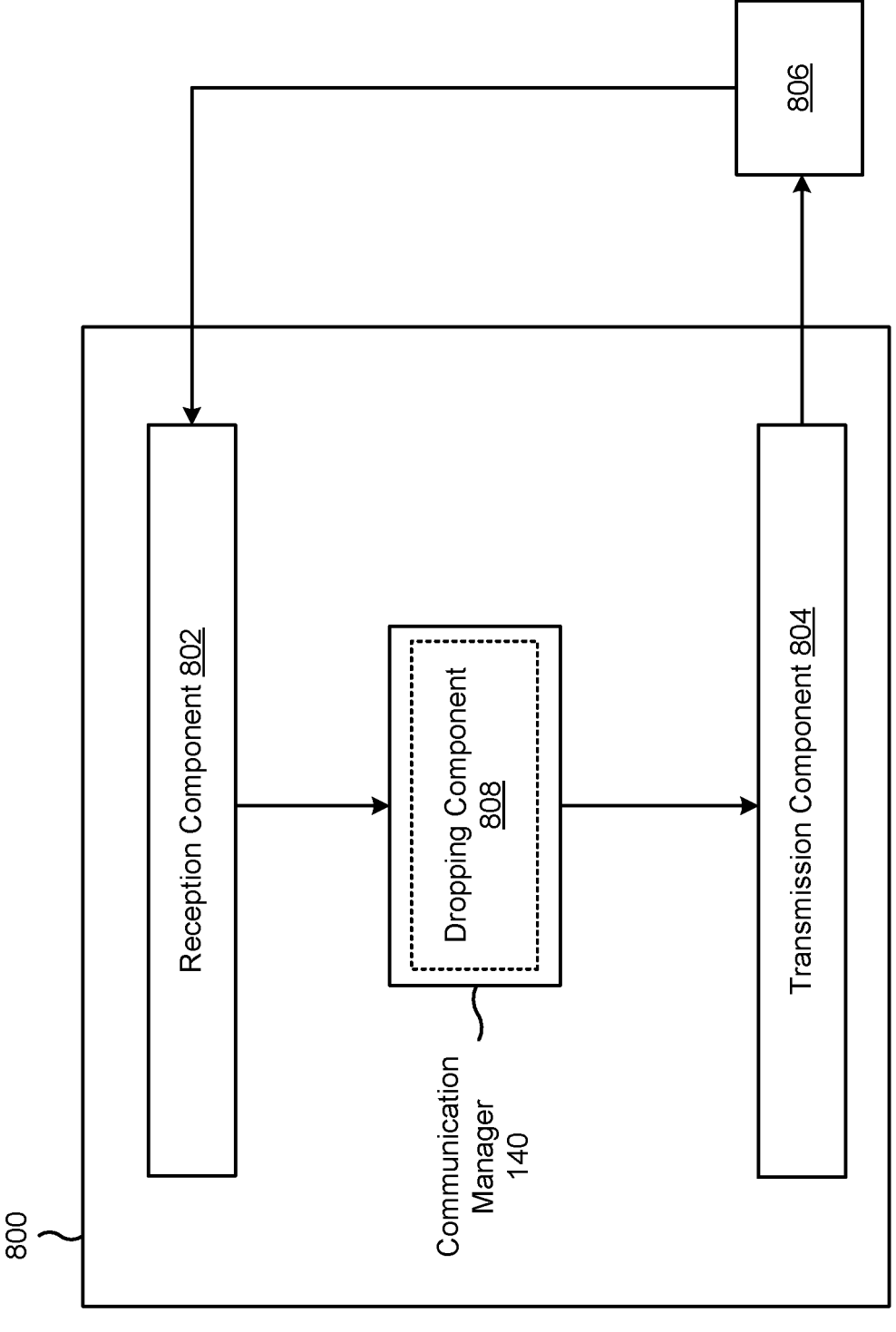
FIGS. 8-9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a dropping component 808, among other examples.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive, from a network entity, a first downlink transmission associated with a first priority based at least in part on a first downlink grant. The reception component 802 may receive, from the network entity, a second downlink transmission associated with a second priority that is higher than the first priority. The dropping component 808 may drop a first uplink transmission associated with the first downlink transmission based at least in part on the first uplink transmission and a second uplink transmission associated with the second downlink transmission being associated with colliding resources in a slot. The transmission component 804 may transmit, to the network entity, the first uplink transmission in a next available slot based at least in part on an indication included in the first downlink grant associated with the first downlink transmission.

The transmission component 804 may attempt to transmit the first uplink transmission for up to the quantity of slots associated with the validity of the uplink channel resource indicator. The reception component 802 may receive the first downlink grant in a first DCI via a first PDCCH transmission. The reception component 802 may receive, from the network entity, a second downlink grant in a second DCI via a second PDCCH transmission, wherein the second downlink grant is associated with the second downlink transmission associated with the second priority. The transmission component 804 may transmit, to the network entity, the second uplink transmission associated with the second priority prior to transmitting the first uplink transmission associated with the first priority.

The reception component 802 may receive, from the network entity and in a second downlink grant associated with the second downlink transmission, a configuration that indicates a validity of an uplink channel resource indicator in a quantity of slots, wherein the first uplink transmission is transmitted in the next available slot based at least in part on the configuration. The reception component 802 may receive, from the network entity, an RRC configuration that indicates a validity of an uplink channel resource indicator in a quantity of slots, wherein the first uplink transmission is transmitted in the next available slot based at least in part on the RRC configuration.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
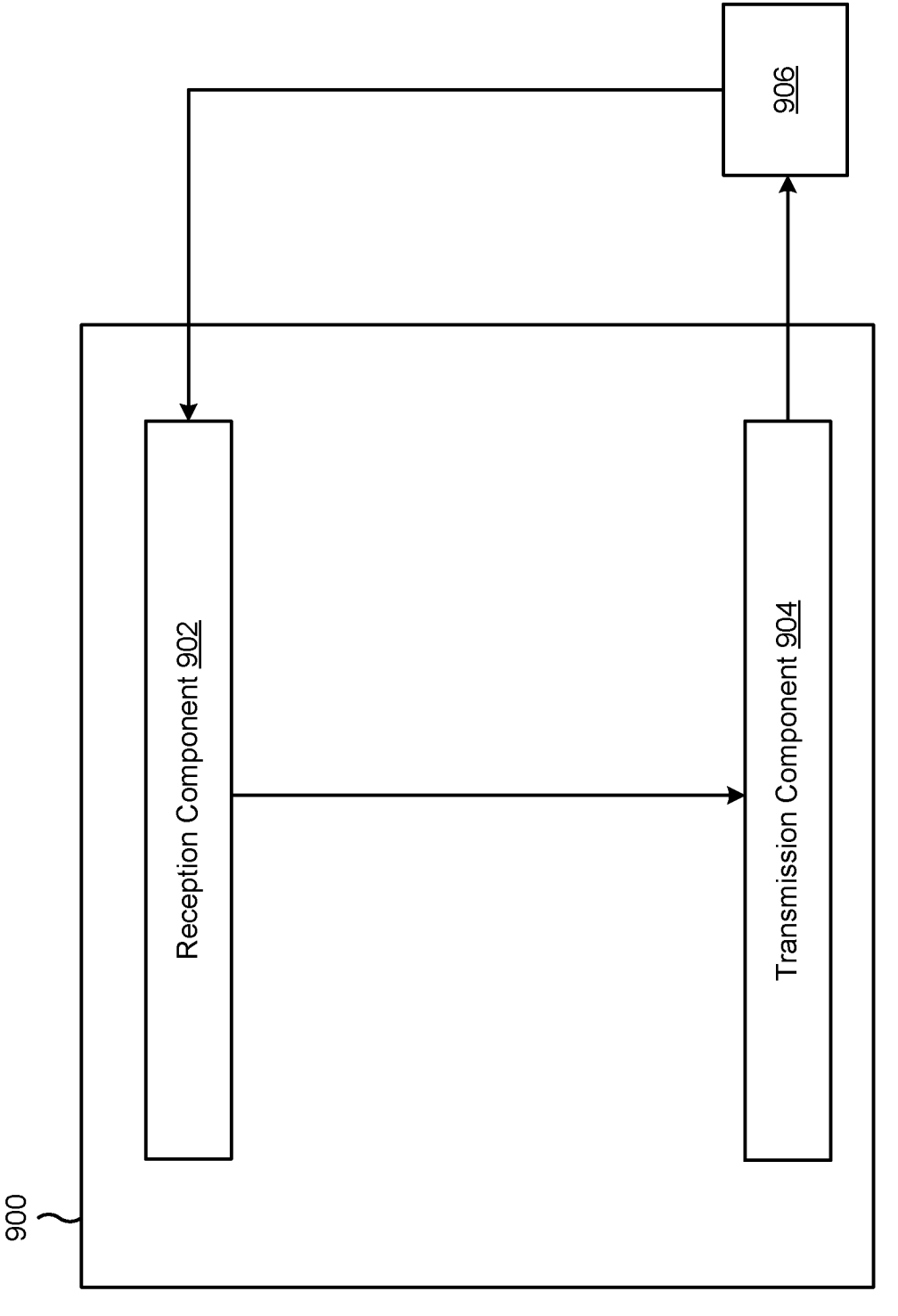

FIG. 9 is a block diagram of an example apparatus 900 for wireless communication. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, a first downlink transmission associated with a first priority based at least in part on a first downlink grant. The transmission component 904 may transmit, to the UE, a second downlink transmission associated with a second priority that is higher than the first priority, wherein a first uplink transmission associated with the first downlink transmission and a second uplink transmission associated with the second downlink transmission correspond to colliding resources in a slot, and wherein the first uplink transmission is dropped in the slot. The reception component 902 may receive, from the UE, the first uplink transmission associated with the first downlink transmission in a next available slot based at least in part on an indication included in the first downlink grant associated with the first downlink transmission.

The transmission component 904 may transmit the first downlink grant in a first DCI via a first PDCCH transmission. The transmission component 904 may transmit, to the UE, a second downlink grant in a second DCI via a second PDCCH transmission, wherein the second downlink grant is associated with the second downlink transmission associated with the second priority. The reception component 902 may receive, from the UE, the second uplink transmission associated with the second priority prior to receiving the first uplink transmission associated with the first priority.

The transmission component 904 may transmit, to the UE and in a second downlink grant associated with the second downlink transmission, a configuration that indicates a validity of an uplink channel resource indicator in a quantity of slots, wherein the first uplink transmission is received in the next available slot based at least in part on the configuration. The transmission component 904 may transmit, to the UE, an RRC configuration that indicates a validity of an uplink channel resource indicator in a quantity of slots, wherein the first uplink transmission is received in the next available slot based at least in part on the RRC configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
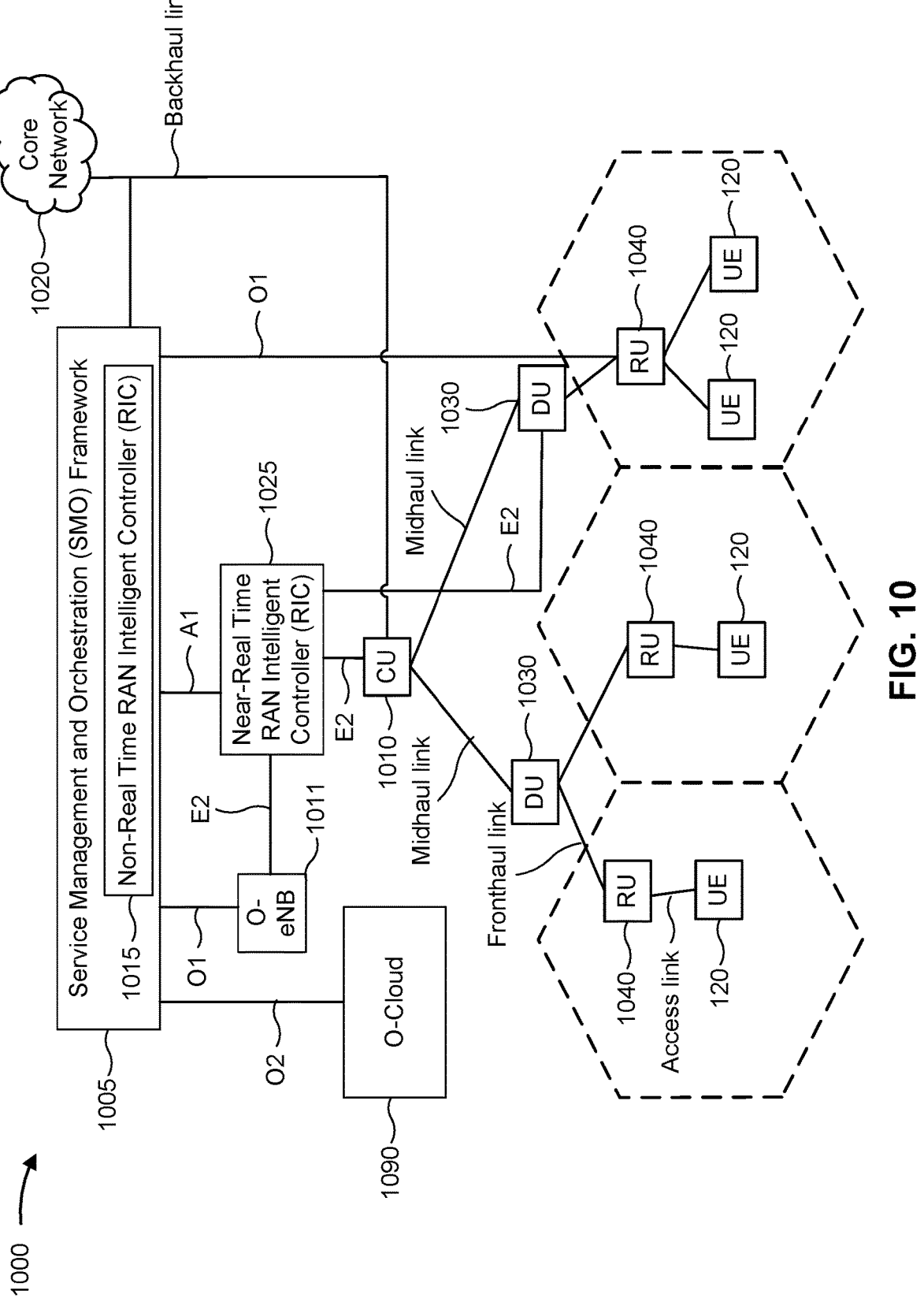
FIG. 10 is a diagram illustrating an example of a disaggregated base station architecture, in accordance with the present disclosure.

FIG. 10 is a diagram illustrating an example 1000 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, e.g., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flex-ibility in network design. The various units of the disaggregated base station, or disaggregated RAN architecture, can be configured for wired or wireless communication with at least one other unit.

The disaggregated base station architecture shown in FIG. 10 may include one or more CUs 1010 that can communicate directly with a core network 1020 via a backhaul link, or indirectly with the core network 1020 through one or more disaggregated base station units (such as a Near-RT RIC 1025 via an E2 link, or a Non-RT RIC 1015 associated with a Service Management and Orchestration (SMO) Framework 1005, or both). A CU 1010 may communicate with one or more DUs 1030 via respective midhaul links, such as an F1 interface. The DUs 1030 may communicate with one or more RUs 1040 via respective fronthaul links. The RUs 1040 may communicate with respective UEs 120 via one or more radio frequency (RF) access links. In some implementations, the UE 120 may be simultaneously served by multiple RUs 1040.

Each of the units (e.g., the CUs 1010, the DUs 1030, the RUs 1040), as well as the Near-RT RICs 1025, the Non-RT RICs 1015, and the SMO Framework 1005, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1010 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1010. The CU 1010 may be configured to handle user plane functionality (e.g., Central Unit-User Plane (CU-UP)), control plane functionality (e.g., Central Unit-Control Plane (CU-CP)), or a combination thereof. In some implementations, the CU 1010 can be logically split into one or more CU-UP units and one or more CU-CP units. The CU-UP unit can communicate bidirectionally with the CU-CP unit via an interface, such as the E1 interface when implemented in an O-RAN configuration. The CU 1010 can be implemented to communicate with the DU 1030, as necessary, for network control and signaling.

The DU 1030 may correspond to a logical unit that includes one or more base station functions to control the operation of one or more RUs 1040. In some aspects, the DU 1030 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1030 may further host one or more low-PHY layers. Each layer (or module) can be implemented with an interface configured to communicate signals with other layers (and modules) hosted by the DU 1030, or with the control functions hosted by the CU 1010.

Lower-layer functionality can be implemented by one or more RUs 1040. In some deployments, an RU 1040, controlled by a DU 1030, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1040 can be implemented to handle over the air (OTA) communication with one or more UEs 120. In some implementations, real-time and non-real-time aspects of control and user plane communication with the RU(s) 1040 can be controlled by the corresponding DU 1030. In some scenarios, this configuration can enable the DU(s) 1030 and the CU 1010 to be implemented in a cloud-based RAN architecture, such as a vRAN architecture.

The SMO Framework 1005 may be configured to support RAN deployment and provisioning of non-virtualized and virtualized network elements. For non-virtualized network elements, the SMO Framework 1005 may be configured to support the deployment of dedicated physical resources for RAN coverage requirements which may be managed via an operations and maintenance interface (such as an O1 interface). For virtualized network elements, the SMO Framework 1005 may be configured to interact with a cloud computing platform (such as an open cloud (O-Cloud) 1090) to perform network element life cycle management (such as to instantiate virtualized network elements) via a cloud computing platform interface (such as an O2 interface). Such virtualized network elements can include, but are not limited to, CUs 1010, DUs 1030, RUs 1040 and Near-RT RICs 1025. In some implementations, the SMO Framework 1005 can communicate with a hardware aspect of a 4G RAN, such as an open eNB (O-eNB) 1011, via an O1 interface. Additionally, in some implementations, the SMO Framework 1005 can communicate directly with one or more RUs 1040 via an O1 interface. The SMO Framework 1005 also may include a Non-RT RIC 1015 configured to support functionality of the SMO Framework 1005.

The Non-RT RIC 1015 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1025. The Non-RT RIC 1015 may be coupled to or communicate with (such as via an A1 interface) the Near-RT RIC 1025. The Near-RT RIC 1025 may be configured to include a logical function that enables near-real-time control and optimization of RAN elements and resources via data collection and actions over an interface (such as via an E2 interface) connecting one or more CUs 1010, one or more DUs 1030, or both, as well as an O-eNB, with the Near-RT RIC 1025.

In some implementations, to generate AI/ML models to be deployed in the Near-RT RIC 1025, the Non-RT RIC 1015 may receive parameters or external enrichment information from external servers. Such information may be utilized by the Near-RT RIC 1025 and may be received at the SMO Framework 1005 or the Non-RT RIC 1015 from non-network data sources or from network functions. In some examples, the Non-RT RIC 1015 or the Near-RT RIC 1025 may be configured to tune RAN behavior or performance. For example, the Non-RT RIC 1015 may monitor long-term trends and patterns for performance and employ AI/ML models to perform corrective actions through the SMO Framework 1005 (such as reconfiguration via 01) or via creation of RAN management policies (such as A1 policies).

As indicated above, FIG. 10 is provided as an example. Other examples may differ from what is described with regard to FIG. 10.

The following provides an overview of some Aspects of the present disclosure:

Aspect 1: A method of wireless communication performed by a user equipment (UE), comprising: receiving, from a network entity, a first downlink transmission associated with a first priority based at least in part on a first downlink grant; receiving, from the network entity, a second downlink transmission associated with a second priority that is higher than the first priority; dropping a first uplink transmission associated with the first downlink transmission based at least in part on the first uplink transmission and a second uplink transmission associated with the second downlink transmission being associated with colliding resources in a slot; and transmitting, to the network entity, the first uplink transmission in a next available slot based at least in part on an indication included in the first downlink grant associated with the first downlink transmission.

Aspect 2: The method of Aspect 1, wherein the indication included in the first downlink grant associated with the first downlink transmission indicates: an uplink channel resource indicator; a symbol timing between the first downlink transmission and a transmission of hybrid automatic repeat request feedback associated with the first uplink transmission; and a validity of the uplink channel resource indicator in a quantity of slots.

Aspect 3: The method of Aspect 2, wherein transmitting the first uplink transmission in the next available slot comprises transmitting the first uplink transmission on the uplink channel resource indicator in the next available slot.

Aspect 4: The method of Aspect 2, further comprising: attempting to transmit the first uplink transmission for up to the quantity of slots associated with the validity of the uplink channel resource indicator.

Aspect 5: The method of any of Aspects 1 through 4, wherein the first downlink transmission is a first physical downlink shared channel (PDSCH) transmission, the second downlink transmission is a second PDSCH transmission, the first uplink transmission is a first physical uplink control channel (PUCCH) transmission, and the second uplink transmission is a second PUCCH transmission.

Aspect 6: The method of any of Aspects 1 through 5, further comprising: receiving, from the network entity, the first downlink grant in a first downlink control information (DCI) via a first physical downlink control channel (PDCCH) transmission; and receiving, from the network entity, a second downlink grant in a second DCI via a second PDCCH transmission, wherein the second downlink grant is associated with the second downlink transmission associated with the second priority.

Aspect 7: The method of any of Aspects 1 through 6, wherein the first downlink transmission associated with the first priority is a low priority downlink transmission, the second downlink transmission associated with the second priority is a high priority downlink transmission, the first uplink transmission associated with the first priority is a low priority uplink transmission, and the second uplink transmission associated with the second priority is a high priority uplink transmission.

Aspect 8: The method of any of Aspects 1 through 7, further comprising: transmitting, to the network entity, the second uplink transmission associated with the second priority prior to transmitting the first uplink transmission associated with the first priority.

Aspect 9: The method of any of Aspects 1 through 8, wherein the first uplink transmission indicates one or more hybrid automatic repeat request (HARQ) bits that satisfy a threshold value, and wherein the one or more HARQ bits are not multiplexed with other uplink control information.

Aspect 10: The method of any of Aspects 1 through 9, further comprising: receiving, from the network entity and in a second downlink grant associated with the second downlink transmission, a configuration that indicates a validity of an uplink channel resource indicator in a quantity of slots, wherein the first uplink transmission is transmitted in the next available slot based at least in part on the configuration.

Aspect 11: The method of any of Aspects 1 through 10, further comprising: receiving, from the network entity, a radio resource control (RRC) configuration that indicates a validity of an uplink channel resource indicator in a quantity of slots, wherein the first uplink transmission is transmitted in the next available slot based at least in part on the RRC configuration.

Aspect 12: The method of any of Aspects 1 through 11, wherein transmitting the first uplink transmission in the next available slot comprises transmitting the first uplink transmission based at least in part on a symbol timing between the first downlink transmission and a transmission of hybrid automatic repeat request feedback associated with the first uplink transmission not equaling a downlink transmission processing time.

Aspect 13: The method of any of Aspects 1 through 12, wherein transmitting the first uplink transmission in the next available slot comprises transmitting the first uplink transmission prior to a next semi-persistent scheduled uplink control channel resource.

Aspect 14: The method of any of Aspects 1 through 13, wherein transmitting the first uplink transmission in the next available slot comprises transmitting the first uplink transmission without receiving a retransmission of the first downlink grant and a retransmission of the first downlink transmission.

Aspect 15: The method of any of Aspects 1 through 14, wherein the first uplink transmission is transmitted in the next available slot based at least in part on the first uplink transmission indicating a negative acknowledgement for the first downlink transmission.

Aspect 16: A method of wireless communication performed by a network entity, comprising: transmitting, to a user equipment (UE), a first downlink transmission associated with a first priority based at least in part on a first downlink grant; transmitting, to the UE, a second downlink transmission associated with a second priority that is higher than the first priority, wherein a first uplink transmission associated with the first downlink transmission and a second uplink transmission associated with the second downlink transmission correspond to colliding resources in a slot, and wherein the first uplink transmission is dropped in the slot; and receiving, from the UE, the first uplink transmission associated with the first downlink transmission in a next available slot based at least in part on an indication included in the first downlink grant associated with the first downlink transmission.

Aspect 17: The method of Aspect 16, wherein the indication included in the first downlink grant associated with the first downlink transmission indicates: an uplink channel resource indicator; a symbol timing between the first downlink transmission and a transmission of hybrid automatic repeat request feedback associated with the first uplink transmission; and a validity of the uplink channel resource indicator in a quantity of slots.

Aspect 18: The method of Aspect 17, wherein receiving the first uplink transmission in the next available slot comprises receiving the first uplink transmission on the uplink channel resource indicator in the next available slot.

Aspect 19: The method of any of Aspects 16 through 18, wherein the first downlink transmission is a first physical downlink shared channel (PDSCH) transmission, the second downlink transmission is a second PDSCH transmission, the first uplink transmission is a first physical uplink control channel (PUCCH) transmission, and the second uplink transmission is a second PUCCH transmission.

Aspect 20: The method of any of Aspects 16 through 19, further comprising: transmitting, to the UE, the first downlink grant in a first downlink control information (DCI) via a first physical downlink control channel (PDCCH) transmission; and transmitting, to the UE, a second downlink grant in a second DCI via a second PDCCH transmission, wherein the second downlink grant is associated with the second downlink transmission associated with the second priority.

Aspect 21: The method of any of Aspects 16 through 20, wherein the first downlink transmission associated with the first priority is a low priority downlink transmission, the second downlink transmission associated with the second priority is a high priority downlink transmission, the first uplink transmission associated with the first priority is a low priority uplink transmission, and the second uplink transmission associated with the second priority is a high priority uplink transmission.

Aspect 22: The method of any of Aspects 16 through 21, further comprising: receiving, from the UE, the second uplink transmission associated with the second priority prior to receiving the first uplink transmission associated with the first priority.

Aspect 23: The method of any of Aspects 16 through 22, wherein the first uplink transmission indicates one or more hybrid automatic repeat request (HARQ) bits that satisfy a threshold value, and wherein the one or more HARQ bits are not multiplexed with other uplink control information.

Aspect 24: The method of any of Aspects 16 through 23, further comprising: transmitting, to the UE and in a second downlink grant associated with the second downlink transmission, a configuration that indicates a validity of an uplink channel resource indicator in a quantity of slots, wherein the first uplink transmission is received in the next available slot based at least in part on the configuration.

Aspect 25: The method of any of Aspects 16 through 24, further comprising: transmitting, to the UE, a radio resource control (RRC) configuration that indicates a validity of an uplink channel resource indicator in a quantity of slots, wherein the first uplink transmission is received in the next available slot based at least in part on the RRC configuration.

Aspect 26: The method of any of Aspects 16 through 25, wherein receiving the first uplink transmission in the next available slot comprises receiving the first uplink transmission based at least in part on a symbol timing between the first downlink transmission and a transmission of hybrid automatic repeat request feedback associated with the first uplink transmission not equaling a downlink transmission processing time.

Aspect 27: The method of any of Aspects 16 through 26, wherein receiving the first uplink transmission in the next available slot comprises receiving the first uplink transmission prior to a next semi-persistent scheduled uplink control channel resource.

Aspect 28: The method of any of Aspects 16 through 27, wherein receiving the first uplink transmission in the next available slot comprises receiving the first uplink transmission without transmitting a retransmission of the first downlink grant and a retransmission of the first downlink transmission.

Aspect 29: The method of any of Aspects 16 through 28, wherein the first uplink transmission is received in the next available slot based at least in part on the first uplink transmission indicating a negative acknowledgement for the first downlink transmission.

Aspect 30: An apparatus for wireless communication at a device, comprising a processor; memory coupled with the processor; and instructions stored in the memory and executable by the processor to cause the apparatus to perform the method of one or more of Aspects 1-15.

Aspect 31: A device for wireless communication, comprising a memory and one or more processors coupled to the memory, the one or more processors configured to perform the method of one or more of Aspects 1-15.

Aspect 32: An apparatus for wireless communication, comprising at least one means for performing the method of one or more of Aspects 1-15.

Aspect 33: A non-transitory computer-readable medium storing code for wireless communication, the code comprising instructions executable by a processor to perform the method of one or more of Aspects 1-15.

Aspect 34: A non-transitory computer-readable medium storing a set of instructions for wireless communication, the set of instructions comprising one or more instructions that, when executed by one or more processors of a device, cause the device to perform the method of one or more of Aspects 1-15.

Aspect 35: An apparatus for wireless communication at a device, comprising a processor; memory coupled with the processor; and instructions stored in the memory and executable by the processor to cause the apparatus to perform the method of one or more of Aspects 16-29.

Aspect 36: A device for wireless communication, comprising a memory and one or more processors coupled to the memory, the one or more processors configured to perform the method of one or more of Aspects 16-29.

Aspect 37: An apparatus for wireless communication, comprising at least one means for performing the method of one or more of Aspects 16-29.

Aspect 38: A non-transitory computer-readable medium storing code for wireless communication, the code comprising instructions executable by a processor to perform the method of one or more of Aspects 16-29.

Aspect 39: A non-transitory computer-readable medium storing a set of instructions for wireless communication, the set of instructions comprising one or more instructions that, when executed by one or more processors of a device, cause the device to perform the method of one or more of Aspects 16-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory;

a transceiver; and one or more processors, coupled to the memory and the transceiver, configured to:

receive, from a network entity via the transceiver, a first
downlink transmission associated with a first priority
based at least in part on a first downlink grant,
wherein an indication included in the first downlink
grant indicates an uplink channel resource indicator,
a symbol timing between the first downlink trans-
mission and a transmission of hybrid automatic
repeat request feedback associated with a first uplink
transmission, and a validity of the uplink channel
resource indicator in a quantity of slots;

receive, from the network entity via the transceiver, a
second downlink transmission associated with a sec-
ond priority that is higher than the first priority;

drop the first uplink transmission associated with the
first downlink transmission based at least in part on
the first uplink transmission and a second uplink
transmission associated with the second downlink
transmission being associated with colliding
resources in a slot; and transmit, to the network entity via the transceiver, the
first uplink transmission in a next available slot
based at least in part on the indication included in the
first downlink grant.

2. The UE of claim 1,
wherein the one or more processors to transmit the first
uplink transmission in the next available slot are con-
figured to transmit the first uplink transmission on the
uplink channel resource indicator in the next available
slot.

3. The UE of claim 2, wherein the one or more processors
are further configured to:
attempt to transmit the first uplink transmission for up to
the quantity of slots associated with the validity of the
uplink channel resource indicator.

4. The UE of claim 1, wherein: the first downlink trans-
mission is a first physical downlink shared channel
(PDSCH) transmission, the second downlink transmission is
a second PDSCH transmission, the first uplink transmission
is a first physical uplink control channel (PUCCH) trans-
mission, and the second uplink transmission is a second
PUCCH transmission; and
the first uplink transmission indicates one or more hybrid
automatic repeat request (HARQ) bits that satisfy a
threshold value, and wherein the one or more HARQ
bits are not multiplexed with other uplink control
information.

5. The UE of claim 1, wherein the one or more processors
are further configured to:
receive, from the network entity via the transceiver, the
first downlink grant in a first downlink control infor-
mation (DCI) via a first physical downlink control
channel (PDCCH) transmission; and
receive, from the network entity via the transceiver, a
second downlink grant in a second DCI via a second
PDCCH transmission, wherein the second downlink
grant is associated with the second downlink transmis-
sion associated with the second priority.

6. The UE of claim 1, wherein the first downlink trans-
mission associated with the first priority is a low priority
downlink transmission, the second downlink transmission
associated with the second priority is a high priority down-
link transmission, the first uplink transmission associated
with the first priority is a low priority uplink transmission,
and the second uplink transmission associated with the
second priority is a high priority uplink transmission.

7. The UE of claim 1, wherein the one or more processors
are further configured to:

transmit, to the network entity via the transceiver, the
second uplink transmission associated with the second
priority prior to transmitting the first uplink transmis-
sion associated with the first priority.

8. The UE of claim 1, wherein the one or more processors
are further configured to:
receive, from the network entity via the transceiver, in a
second downlink grant associated with the second
downlink transmission, a configuration that indicates a
validity of an uplink channel resource indicator in a
quantity of slots, wherein the first uplink transmission
is transmitted in the next available slot based at least in
part on the configuration; or
receive, from the network entity via the transceiver, a
radio resource control (RRC) configuration that indi-
cates the validity of the uplink channel resource indi-
cator in the quantity of slots, wherein the first uplink
transmission is performed in the next available slot
based at least in part on the RRC configuration.

9. The UE of claim 1, wherein the one or more processors,
to transmit the first uplink transmission in the next available
slot, are configured to:
transmit the first uplink transmission based at least in part
on a symbol timing between the first downlink trans-
mission and a transmission of hybrid automatic repeat
request feedback associated with the first uplink trans-
mission not equaling a downlink transmission process-
ing time;
transmit the first uplink transmission prior to a next
semi-persistent scheduled uplink control channel
resource; or
transmit the first uplink transmission without receiving a
retransmission of the first downlink grant and a retrans-
mission of the first downlink transmission.

10. The UE of claim 1, wherein the first uplink transmis-
sion is transmitted in the next available slot based at least in
part on the first uplink transmission indicating a negative
acknowledgement for the first downlink transmission.

11. A network entity for wireless communication, com-
prising:
a memory;
a transceiver; and
one or more processors, coupled to the memory and the
transceiver, configured to:
transmit, to a user equipment (UE) via the transceiver,
a first downlink transmission associated with a first
priority based at least in part on a first downlink
grant, wherein an indication included in the first
downlink grant indicates an uplink channel resource
indicator, a symbol timing between the first down-
link transmission and a transmission of hybrid auto-
matic repeat request feedback associated with a first
uplink transmission, and a validity of the uplink
channel resource indicator in a quantity of slots;
transmit, to the UE via the transceiver, a second down-
link transmission associated with a second priority
that is higher than the first priority, wherein the first
uplink transmission associated with the first down-
link transmission and a second uplink transmission
associated with the second downlink transmission
correspond to colliding resources in a slot, and
wherein the first uplink transmission is dropped in
the slot; and
receive, from the UE via the transceiver, the first uplink
transmission associated with the first downlink trans-
mission in a next available slot based at least in part
on the indication included in the first downlink grant.

12. The network entity of claim 11, wherein receiving the first uplink transmission in the next available slot comprises receiving the first uplink transmission on the uplink channel resource indicator in the next available slot.

13. The network entity of claim 11, wherein: the first downlink transmission is a first physical downlink shared channel (PDSCH) transmission, the second downlink transmission is a second PDSCH transmission, the first uplink transmission is a first physical uplink control channel (PUCCH) transmission, and the second uplink transmission is a second PUCCH transmission; and the first uplink transmission indicates one or more hybrid automatic repeat request (HARQ) bits that satisfy a threshold value, and wherein the one or more HARQ bits are not multiplexed with other uplink control information.

14. The network entity of claim 11, wherein the one or more processors are further configured to:

transmit, to the UE via the transceiver, the first downlink grant in a first downlink control information (DCI) via a first physical downlink control channel (PDCCH) transmission; and transmit, to the UE via the transceiver, a second downlink grant in a second DCI via a second PDCCH transmission, wherein the second downlink grant is associated with the second downlink transmission associated with the second priority.

15. The network entity of claim 11, wherein the first downlink transmission associated with the first priority is a low priority downlink transmission, the second downlink transmission associated with the second priority is a high priority downlink transmission, the first uplink transmission associated with the first priority is a low priority uplink transmission, and the second uplink transmission associated with the second priority is a high priority uplink transmission.

16. The network entity of claim 11, wherein the one or more processors are further configured to:

receive, from the UE via the transceiver, the second uplink transmission associated with the second priority prior to receiving the first uplink transmission associated with the first priority.

17. The network entity of claim 11, wherein the one or more processors are further configured to:

transmit, to the UE via the transceiver and in a second downlink grant associated with the second downlink transmission, a configuration that indicates a validity of an uplink channel resource indicator in a quantity of slots, wherein the first uplink transmission is received in the next available slot based at least in part on the configuration; or transmit, to the UE via the transceiver, a radio resource control (RRC) configuration that indicates the validity of the uplink channel resource indicator in the quantity of slots, wherein the first uplink transmission is received in the next available slot based at least in part on the RRC configuration.

18. The network entity of claim 11, wherein the one or more processors, to receive the first uplink transmission in the next available slot, are configured to:

receive the first uplink transmission based at least in part on a symbol timing between the first downlink transmission and a transmission of hybrid automatic repeat request feedback associated with the first uplink transmission not equaling a downlink transmission processing time;

receive the first uplink transmission in the next available slot, are configured to receive the first uplink transmission prior to a next semi-persistent scheduled uplink control channel resource; or receive the first uplink transmission without transmitting a retransmission of the first downlink grant and a retransmission of the first downlink transmission.

19. The network entity of claim 11, wherein the first uplink transmission is received in the next available slot based at least in part on the first uplink transmission indicating a negative acknowledgement for the first downlink transmission.

20. A method of wireless communication performed by a user equipment (UE), comprising:

receiving, from a network entity, a first downlink transmission associated with a first priority based at least in part on a first downlink grant, wherein an indication included in the first downlink grant indicates an uplink channel resource indicator, a symbol timing between the first downlink transmission and a transmission of hybrid automatic repeat request feedback associated with a first uplink transmission, and a validity of the uplink channel resource indicator in a quantity of slots;

receiving, from the network entity, a second downlink transmission associated with a second priority that is higher than the first priority;

dropping the first uplink transmission associated with the first downlink transmission based at least in part on the first uplink transmission and a second uplink transmission associated with the second downlink transmission being associated with colliding resources in a slot; and transmitting, to the network entity, the first uplink transmission in a next available slot based at least in part on the indication included in the first downlink grant associated with the first downlink transmission.

21. The method of claim 20, wherein transmitting the first uplink transmission in the next available slot comprises transmitting the first uplink transmission on the uplink channel resource indicator in the next available slot.

22. The method of claim 21, further comprising: attempting to transmit the first uplink transmission for up to the quantity of slots associated with the validity of the uplink channel resource indicator.

23. The method of claim 20, further comprising: receiving the first downlink grant in a first downlink control information (DCI) via a first physical downlink control channel (PDCCH) transmission; and receiving, from the network entity, a second downlink grant in a second DCI via a second PDCCH transmission, wherein the second downlink grant is associated with the second downlink transmission associated with the second priority.

24. The method of claim 20, wherein the first downlink transmission associated with the first priority is a low priority downlink transmission, the second downlink transmission associated with the second priority is a high priority downlink transmission, the first uplink transmission associated with the first priority is a low priority uplink transmission, and the second uplink transmission associated with the second priority is a high priority uplink transmission.

25. The method of claim 20, further comprising: receiving, from the network entity and in a second downlink grant associated with the second downlink transmission, a configuration that indicates a validity of an uplink channel resource indicator in a quantity of slots, wherein the first uplink transmission is transmitted in the next available slot based at least in part on the configuration; or receiving, from the network entity, a radio resource control (RRC) configuration that indicates a validity of an uplink channel resource indicator in a quantity of slots, wherein the first uplink transmission is transmitted in the next available slot based at least in part on the RRC configuration.

26. The method of claim 20, wherein transmitting the first uplink transmission in the next available slot comprises:

transmitting the first uplink transmission based at least in part on a symbol timing between the first downlink transmission and a transmission of hybrid automatic repeat request feedback associated with the first uplink transmission not equaling a downlink transmission processing time;

transmitting the first uplink transmission in the next available slot comprises transmitting the first uplink transmission prior to a next semi-persistent scheduled uplink control channel resource; or transmitting the first uplink transmission in the next available slot comprises transmitting the first uplink transmission without receiving a retransmission of the first downlink grant and a retransmission of the first downlink transmission.

27. A method of wireless communication performed by a network entity, comprising:

transmitting, to a user equipment (UE), a first downlink transmission associated with a first priority based at least in part on a first downlink grant, wherein an indication included in the first downlink grant indicates an uplink channel resource indicator, a symbol timing between the first downlink transmission and a transmission of hybrid automatic repeat request feedback associated with a first uplink transmission, and a validity of the uplink channel resource indicator in a quantity of slots;

transmitting, to the UE, a second downlink transmission associated with a second priority that is higher than the first priority, wherein the first uplink transmission associated with the first downlink transmission and a second uplink transmission associated with the second downlink transmission correspond to colliding resources in a slot, and wherein the first uplink transmission is dropped in the slot; and receiving, from the UE, the first uplink transmission associated with the first downlink transmission in a next available slot based at least in part on the indication included in the first downlink grant associated with the first downlink transmission.

28. The method of claim 27, wherein receiving the first uplink transmission in the next available slot comprises receiving the first uplink transmission on the uplink channel resource indicator in the next available slot.

29. The method of claim 27, further comprising: transmitting, to the UE and in a second downlink grant associated with the second downlink transmission, a configuration that indicates a validity of an uplink channel resource indicator in a quantity of slots, wherein the first uplink transmission is received in the next available slot based at least in part on the configuration; or transmitting, to the UE, a radio resource control (RRC) configuration that indicates a validity of an uplink channel resource indicator in a quantity of slots, wherein the first uplink transmission is received in the next available slot based at least in part on the RRC configuration.

30. The method of claim 27, wherein receiving the first uplink transmission in the next available slot comprises:

receiving the first uplink transmission based at least in part on a symbol timing between the first downlink transmission and a transmission of hybrid automatic repeat request feedback associated with the first uplink transmission not equaling a downlink transmission processing time;

receiving the first uplink transmission prior to a next semi-persistent scheduled uplink control channel resource; or receiving the first uplink transmission without transmitting a retransmission of the first downlink grant and a retransmission of the first downlink transmission.

* * * * *